United States Patent
Kobayashi

(10) Patent No.: US 10,933,717 B2
(45) Date of Patent: Mar. 2, 2021

(54) REFRIGERATION CYCLE DEVICE

(71) Applicant: DENSO CORPORATION, Kariya (JP)

(72) Inventor: Hiroyuki Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 190 days.

(21) Appl. No.: 16/288,476

(22) Filed: Feb. 28, 2019

(65) Prior Publication Data

US 2019/0193517 A1   Jun. 27, 2019

Related U.S. Application Data

(63) Continuation of application No. PCT/JP2017/028663, filed on Aug. 8, 2017.

(30) Foreign Application Priority Data

Sep. 2, 2016   (JP) .............................. JP2016-172115

(51) Int. Cl.
*B60H 1/00* (2006.01)
*B60H 1/22* (2006.01)
*B60H 1/32* (2006.01)
*F25B 1/00* (2006.01)

(52) U.S. Cl.
CPC .......... *B60H 1/00921* (2013.01); *B60H 1/00* (2013.01); *B60H 1/00835* (2013.01); *B60H 1/22* (2013.01); *B60H 1/3205* (2013.01); *F25B 1/00* (2013.01); *B60H 2001/3242* (2013.01); *B60H 2001/3283* (2013.01)

(58) Field of Classification Search
CPC .. B60H 1/00; B60H 1/00835; B60H 1/00921; B60H 1/22; B60H 1/3205; B60H 1/3241; B60H 1/3242; B60H 1/3282; B60H 1/3283; F25B 1/00
See application file for complete search history.

(56) References Cited

U.S. PATENT DOCUMENTS

| | | | |
|---|---|---|---|
| 8,984,903 B2 * | 3/2015 | Itoh ..................... | B60H 1/00921 62/196.1 |
| 2012/0255319 A1 | 10/2012 | Itoh et al. | |
| 2014/0360215 A1* | 12/2014 | Inaba ................. | B60H 1/00485 62/216 |

FOREIGN PATENT DOCUMENTS

| | | |
|---|---|---|
| JP | H06143996 A | 5/1994 |
| JP | 2012225637 A | 11/2012 |

* cited by examiner

*Primary Examiner* — Marc E Norman
(74) *Attorney, Agent, or Firm* — Harness, Dickey & Pierce, P.L.C.

(57) ABSTRACT

A refrigeration cycle device has a cooling heat exchanger, an evaporation-pressure control valve, an inside-air ratio adjuster, and a controller. The evaporation-pressure control valve controls an evaporation pressure of a refrigerant in the cooling heat exchanger. The inside-air ratio adjuster changes a ratio of an inside air to an entire volume of the air exchanging heat with the refrigerant in the cooling heat exchanger. The controller controls the inside-air ratio adjuster. The evaporation-pressure control valve increases the evaporation pressure of the refrigerant as a flow rate of the refrigerant flowing through the evaporation-pressure control valve increases. The controller, in a first mode, increases the ratio of the inside air as an evaporation temperature of the refrigerant in the cooling heat exchanger falls.

6 Claims, 8 Drawing Sheets

FIG. 7

| | COOLING MODE | DEHUMIDIFYING AND HEATING MODE | HEATING MODE |
|---|---|---|---|
| FIRST SWITCHING VALVE | CLOSED | OPEN | OPEN |
| SECOND SWITCHING VALVE | CLOSED | OPEN | CLOSED |
| AIR MIX DOOR | FULLY OPEN COOL-AIR BYPASS PASSAGE | FULLY CLOSE COOL-AIR BYPASS PASSAGE | FULLY CLOSE COOL-AIR BYPASS PASSAGE |
| FIRST EXPANSION VALVE | FULLY OPEN | OPENING DEGREE IS REDUCED | OPENING DEGREE IS REDUCED |
| SECOND EXPANSION VALVE | OPENING DEGREE IS REDUCED | OPENING DEGREE IS REDUCED | FULLY CLOSED |

REFRIGERATION CYCLE DEVICE

CROSS REFERENCE TO RELATED APPLICATIONS

The present application is a continuation application of International Patent Application No. PCT/JP2017/028663 filed on Aug. 8, 2017, which designated the United States and claims the benefit of priority from Japanese Patent Application No. 2016-172115 filed on Sep. 2, 2016. The entire disclosures of all of the above applications are incorporated herein by reference.

TECHNICAL FIELD

The present disclosure relates to a refrigeration cycle device.

BACKGROUND

Refrigeration cycle devices mounted to an air conditioner for a vehicle may be configured to set various refrigeration circuits in various modes. Such refrigeration cycle devices may include an evaporation-pressure control valve that controls an evaporation pressure of a refrigerant in a cooling heat exchanger.

SUMMARY

This section provides a general summary of the disclosure, and is not a comprehensive disclosure of its full scope or all of its features.

An aspect of the present disclosure provides a refrigeration cycle device mounted to an air conditioner. The refrigeration cycle device has a compressor, a heating heat exchanger, a first decompressor, an exterior heat exchanger, a second decompressor, a cooling heat exchanger, an evaporation-pressure control valve, an inside-air ratio adjuster, and a controller.

The compressor compresses a refrigerant and discharges the refrigerant. The heating heat exchanger heats an air flowing toward an air conditioning target space. The heating heat exchanger uses, as a heat source, the refrigerant discharged from the compressor. The first decompressor decompresses the refrigerant. The exterior heat exchanger performs a heat exchange between the refrigerant decompressed in the first decompressor and an outside air. The outside air is an air outside the air conditioning target space. The second decompressor decompresses the refrigerant. The cooling heat exchanger performs a heat exchange between the refrigerant decompressed in the second decompressor and air before passing through the heating heat exchanger. The evaporation-pressure control valve controls an evaporation pressure of the refrigerant in the cooling heat exchanger. The inside-air ratio adjuster changes a ratio of an inside air to an entire volume of the air exchanging heat with the refrigerant in the cooling heat exchanger. The inside air is an air inside an air conditioning target space. The controller controls the inside-air ratio adjuster. The evaporation-pressure control valve increases the evaporation pressure of the refrigerant as a flow rate of the refrigerant flowing through the evaporation-pressure control valve increases.

BRIEF DESCRIPTION OF DRAWINGS

The above and other objects, features and advantages of the present disclosure will become more apparent from the following detailed description made with reference to the accompanying drawings.

FIG. 7 is a chart indicating actuation states of various air conditioning control equipment in each operation mode according to the first embodiment.

DETAILED DESCRIPTION

Figure 1:
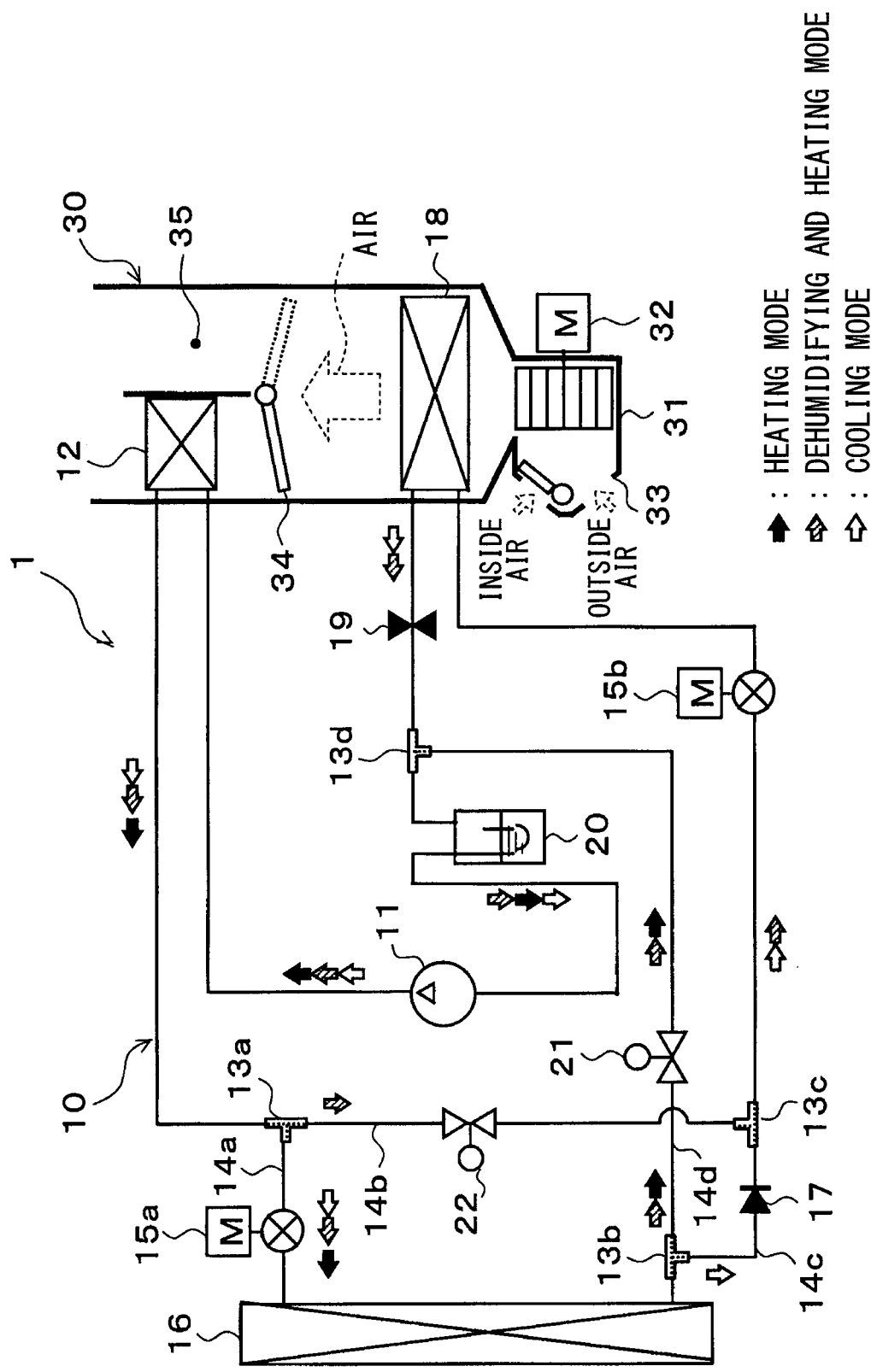
FIG. 1 is a diagram depicting an entire configuration of an air conditioner for a vehicle according to a first embodiment.

As an example, a refrigeration cycle device may be mounted to an air conditioner for a vehicle. The refrigeration cycle may be configured to set various refrigeration circuits in various modes respectively. The refrigeration cycle device may include an evaporation-pressure control valve that controls an evaporation pressure of a refrigerant in a cooling heat exchanger of the refrigeration cycle.

The various refrigeration circuits may include a refrigeration circuit in a heating mode, a refrigeration circuit in a dehumidifying and heating mode, and a refrigeration circuit in a cooling mode.

The refrigeration circuit in the dehumidifying and heating mode includes an interior evaporator and an exterior heat exchanger. The interior evaporator serves as a cooling heat exchanger that cools air by evaporating a refrigerant. The exterior heat exchanger exchanges heat between the refrigerant and outside air (i.e., air outside the cabin). The interior evaporator and the exterior heat exchanger are connected to each other in parallel with each other.

In the refrigeration circuit in the dehumidifying and heating mode, the exterior heat exchanger absorbs heat from the outside air, and the interior condenser (serving as a heating heat exchanger) radiates the heat to the cooled air flowing from the interior evaporator. Thus, the refrigeration cycle device sets the refrigeration circuit for dehumidifying and heating the inside air in the cabin.

The evaporation-pressure control valve is located downstream of the interior evaporator in a flow direction of refrigerant. The evaporation-pressure control valve regulates an evaporation pressure of the refrigerant in the interior evaporator to be a specified pressure regardless of the evaporation pressure of the refrigerant in the exterior heat exchanger. As such, the evaporation-pressure control valve prevents the interior evaporator from being frosted in the dehumidifying and heating mode.

A level of a heating performance for heating the air in the dehumidifying and heating mode relates to an amount of heat radiated from the refrigerant in the interior condenser. More specifically, the level of the heating performance corresponds to a sum of an amount of heat corresponding to a compression workload of the compressor, an amount of heat absorbed by the refrigerant from outside air in the exterior heat exchanger, and an amount of heat (i.e., an amount of heat on an air side) absorbed by the refrigerant from air in the interior evaporator.

As such, the heating performance in the dehumidifying and heating mode is adjusted by adjusting the compression workload of the compressor, the amount of heat absorbed by the refrigerant from the outside air, and the amount of heat absorbed by the refrigerant from the air. However, when reducing a power consumption of the compressor, it may not preferable to increase a refrigerant discharge capacity of the compressor, i.e., an amount of the compressed refrigerant discharged from the compressor, for increasing the heating performance in the dehumidifying and heating mode.

It may be considered to adjust the amount of heat absorbed by the refrigerant from the outside air in the exterior heat exchanger to control the heating performance in the dehumidifying and heating mode. The amount of heat absorbed by the refrigerant from the outside air is determined based on a difference between an evaporation temperature of the refrigerant and a temperature of the outside air in the exterior heat exchanger.

However, the amount of heat absorbed by the refrigerant from the outside air would not be set to a required amount when the temperature of the outside air changes after adjusting the evaporation temperature of the refrigerant in the exterior heat exchanger. That is, the heating performance in the dehumidifying and heating mode would not be adjusted to a required level.

Then, it may be considered to adjust the amount of heat absorbed by the refrigerant from the air in the cooling heat exchanger for adjusting the heating performance in the dehumidifying and heating mode. However, the evaporation temperature of the refrigerant in the interior evaporator is dependent on a pressure regulating property of the evaporation-pressure control valve. As such, the heating performance in the dehumidifying and heating mode would not be adjusted to a required level when the heating performance is adjusted by adjusting the amount of heat absorbed by the refrigerant from the air. Thus, it would be hard to adjust the heating performance for heating the air in the dehumidifying and heating mode.

The present disclosure addresses the above-described issues.

Embodiments of the present disclosure will be described hereafter with reference to the drawings. In the embodiments, a part that corresponds to or equivalents to a matter described in a preceding embodiment may be assigned with the same reference number.

First Embodiment

A first embodiment will be described in detail with reference to the drawings, in which a refrigeration cycle device according to the present disclosure is included in an air conditioner for a vehicle used for regulation of temperature of a cabin (i.e., a vehicle compartment) to an appropriate value.

The first embodiment provides a refrigeration cycle device 10 that is included in an air conditioner 1 for a vehicle mounted on an electric vehicle configured to acquire drive power for vehicle travel from an electric motor. The refrigeration cycle device 10 in the air conditioner 1 for a vehicle is configured to cool or heat air sent to the cabin as an air conditioning target space. The air sent to the cabin thus serves as heat exchange target fluid in the first embodiment.

The refrigeration cycle device 10 is configured to set various refrigeration circuit including a refrigeration circuit in a heating mode, a refrigeration circuit in a dehumidifying and heating mode, and a refrigeration circuit in a cooling mode. The heating mode in the air conditioner 1 for a vehicle is an operation mode of heating air and sending the heated air to the cabin. The dehumidifying and heating mode (a first mode) is an operation mode of reheating cooled and dehumidified air and sending the reheated air to the cabin. The cooling mode (a second mode) is an operation mode of cooling air and sending the cooled air to the cabin.

FIG. 1 includes arrows painted in black indicating a flow of a refrigerant in the refrigeration circuit in the heating mode, and arrows hatched by oblique lines indicating a flow of the refrigerant in the refrigeration circuit in the dehumidifying and heating mode. FIG. 1 also includes hollow arrows indicating a flow of the refrigerant in the refrigeration circuit in the cooling mode.

In the refrigeration cycle device 10, the refrigerant is HFC refrigerant (e.g., R134a), and a vapor compression subcritical refrigeration circuit in which a pressure Pd of the refrigerant at a high pressure does not exceed a critical pressure of the refrigerant is formed. The refrigeration cycle device 10 may alternatively adopt an HFO refrigerant (e.g., R1234yf) or the like as the refrigerant. The refrigerant is mixed with refrigerating machine oil lubricating a compressor 11, and part of the refrigerating machine oil circulates in the cycle along with the refrigerant.

As shown in FIG. 1, the refrigeration cycle device 10 includes the compressor 11, a first expansion valve 15a, a second expansion valve 15b, an exterior heat exchanger 16, a check valve 17, an interior evaporator 18, an evaporation-pressure control valve 19, an accumulator 20, a first switching valve 21, a second switching valve 22, and an interior air conditioning unit 30.

The compressor 11 draws a refrigerant, compresses the refrigerant, and discharges the compressed refrigerant. The compressor 11 is disposed inside a vehicle engine hood. The compressor 11 is configured as a motor compressor that drives a fixed capacity compression mechanism having fixed discharge capacity by means of an electric motor. Examples of the compression mechanism include various compression mechanisms such as a scrolling compression mechanism and a vane compression mechanism.

The electric motor configuring the compressor 11 has operation (rotational speed) controlled based on a control signal output from an air-conditioning controller 40 to be described later. The electric motor may be of any type, such as an AC motor or a DC motor. The air-conditioning controller 40 controls the rotational speed of the electric motor to change refrigerant discharge capability of the compression mechanism. The electric motor thus configures a discharge capability changer of the compression mechanism.

The compressor 11 has a discharge port connected to a refrigerant inlet of an interior condenser 12. The interior condenser 12 functions as a heating heat exchanger in the heating mode or in the dehumidifying and heating mode. In the heating mode or in the dehumidifying and heating mode, the interior condenser 12 heats air by exchanging heat between the refrigerant having high temperature and high pressure and discharged from the compressor 11 and air having passed through the interior evaporator 18 to be described later. The interior condenser 12 is disposed in a casing 31 of the interior air conditioning unit 30 to be described later.

The interior condenser 12 has a refrigerant outlet connected to one of flow gateways of a first three-way joint 13a. A three-way joint like the first three-way joint 13a serves as a branching portion or a merging portion in the refrigeration cycle device 10.

For example, in the dehumidifying and heating mode, one of the three flow gateways of the first three-way joint 13a serves as an inflow port and the remaining two serve as outflow ports. The first three-way joint 13a in the dehumidifying and heating mode thus serves as the branching portion causing the refrigerant flowing in through the single inflow port to be branched and flow out of the two outflow ports. Such a three-way joint may be formed by joining a plurality of pipes or may be configured by a metal block or a resin block provided with a plurality of refrigerant passages.

The refrigeration cycle device 10 further includes a second three-way joint 13b, a third three-way joint 13c, and a fourth three-way joint 13d, as to be described later. The second three-way joint 13b, the third three-way joint 13c, and the fourth three-way joint 13d are each configured basically similarly to the first three-way joint 13a. For example, in the dehumidifying and heating mode, two of the three flow gateways of the fourth three-way joint 13d serve as inflow ports and the remaining one thereof serves as an outflow port. The fourth three-way joint 13d in the dehumidifying and heating mode thus serves as the merging portion causing the refrigerant flowing in through the two inflow ports to be merged and flow out of the single outflow port.

The first three-way joint 13a has another one of the flow gateways connected to a first refrigerant passage 14a. The first refrigerant passage 14a guides the refrigerant flowing out of the interior condenser 12 to a refrigerant inlet of the exterior heat exchanger 16.

The first three-way joint 13a has still another one of the flow gateways connected to a second refrigerant passage 14b. The second refrigerant passage 14b guides the refrigerant flowing out of the interior condenser 12 to an inlet of the second expansion valve 15b disposed on a third refrigerant passage 14c to be described later. Specifically, the second refrigerant passage 14b guides the refrigerant flowing out of the interior condenser 12 to one of the flow gateways of the third three-way joint 13c.

The first expansion valve 15a is disposed in the first refrigerant passage 14a. The first expansion valve 15a reduces a pressure of, i.e., decompresses, the refrigerant flowing out of the interior condenser 12 in the heating mode and the dehumidifying and heating mode. The first expansion valve 15a serves as a first decompressor in the present disclosure. The first expansion valve 15a is a variable throttle mechanism formed of a valve body and an electric actuator. The valve body is configured to change an opening degree (i.e., a throttle degree) of the first expansion valve 15a. The electric actuator is formed of a stepping motor that moves the valve body to change the opening degree of the first expansion valve 15a.

The variable throttle mechanism forming the first expansion valve 15a has a fully opening function. Specifically, when the opening degree of the first expansion valve 15a is at a maximum degree, i.e., when the first expansion valve 15a is fully open, the first expansion valve 15a hardly reduces the pressure of the refrigerant and serves as a refrigerant path. An operation of the first expansion valve 15a is controlled based on a control signal (i.e., a control pulse) output from the air-conditioning controller 40.

The first expansion valve 15a has an outlet connected to the refrigerant inlet of the exterior heat exchanger 16. The exterior heat exchanger 16 exchanges heat between the refrigerant flowing out of the first expansion valve 15a and air (i.e., outside air) outside the cabin discharged from a blower fan (not shown). The exterior heat exchanger 16 is disposed in a vehicle front portion inside the vehicle engine hood. The blower fan is an electric fan having rotational speed (in other words, ventilation capability) controlled based on a control voltage output from the air-conditioning controller 40. The ventilation capability corresponds to volume of air sent from the blower fan.

The exterior heat exchanger 16 has a refrigerant outlet connected to one of the flow gateways of the second three-way joint 13b. The second three-way joint 13b has another one of the flow gateways connected to the third refrigerant passage 14c. The third refrigerant passage 14c guides the refrigerant flowing out of the exterior heat exchanger 16 to a refrigerant inlet of the interior evaporator 18.

The second three-way joint 13b has still another one of the flow gateways connected to a fourth refrigerant passage 14d. The fourth refrigerant passage 14d guides the refrigerant flowing out of the exterior heat exchanger 16 to an inlet of the accumulator 20 to be described later. Specifically, the fourth refrigerant passage 14d guides the refrigerant flowing out of the exterior heat exchanger 16 to one of the flow gateways of the fourth three-way joint 13d.

The third refrigerant passage 14c is provided with the check valve 17, the third three-way joint 13c, and the second expansion valve 15b in the mentioned order along the flow of the refrigerant. The check valve 17 allows the refrigerant to flow only from the second three-way joint 13b toward the interior evaporator 18. The third three-way joint 13c is connected to the second refrigerant passage 14b.

The second expansion valve 15b reduces a pressure of, i.e., decompresses, the refrigerant flowing from the exterior heat exchanger 16 to the interior evaporator 18. The second expansion valve 15b serves as a second decompressor in the present disclosure. The second expansion valve 15b has the same basic structure as the first expansion valve 15a. In the present embodiment, the second expansion valve 15b is formed of a variable throttle mechanism having a fully closing function. Specifically, the second expansion valve 15b is disposed in a refrigerant passage. The second expansion valve 15b fully closes the refrigerant passage when an opening degree of the second expansion valve 15b is minimized, i.e., when the second expansion valve 15b is fully closed.

The refrigeration cycle device 10 according to the first embodiment is thus configured to fully close the second expansion valve 15b and close the third refrigerant passage 14c to achieve switching among the refrigeration circuits. In other words, the second expansion valve 15b functions as a refrigerant decompressor as well as a refrigeration circuit switcher configured to switch among the refrigeration circuits for the refrigerant circulating in the cycle.

The interior evaporator 18 serves as a cooling heat exchanger in the cooling mode and in the dehumidifying and heating mode. That is, in each of the cooling mode and the dehumidifying and heating mode, the interior evaporator 18 performs a heat exchange between the refrigerant after flowing out of the second expansion valve 15*b* and the air before passing through the interior condenser 12. The interior evaporator 18 evaporates the refrigerant after decompressed in the second expansion valve 15*b*. The refrigerant absorbs heat when being evaporated. Thus, the interior evaporator 18 cools the air using the heat absorption action of the refrigerant being evaporated. The interior evaporator 18 is disposed in the casing 31 of the interior air conditioning unit 30 and is located upstream of the interior condenser 12 in a flow direction of air.

The interior evaporator 18 has a refrigerant outlet connected to an inflow port 91*a* of the evaporation-pressure control valve 19. The evaporation-pressure control valve 19 regulates an evaporation pressure of the refrigerant in the interior evaporator 18 to be a frosting suppressive pressure APe or higher to prevent the interior evaporator 18 from being frosted. The evaporation pressure of the refrigerant in the interior evaporator 18 is, in other words, a pressure Pe of the refrigerant at a low pressure, i.e., on a low pressure side. In other words, the evaporation-pressure control valve 19 regulates an evaporation temperature Te of the refrigerant in the interior evaporator 18 to be equal to or higher than a frosting suppressive temperature ATe.

In the first embodiment, the refrigerant may be R134a, and the frosting suppressive temperature ATe is set to be slightly higher than 0° C. As such, the frosting suppressive pressure APe is set to be slightly higher than 0.293 MPa that is a saturation pressure of R134a at 0° C.

Figure 2:
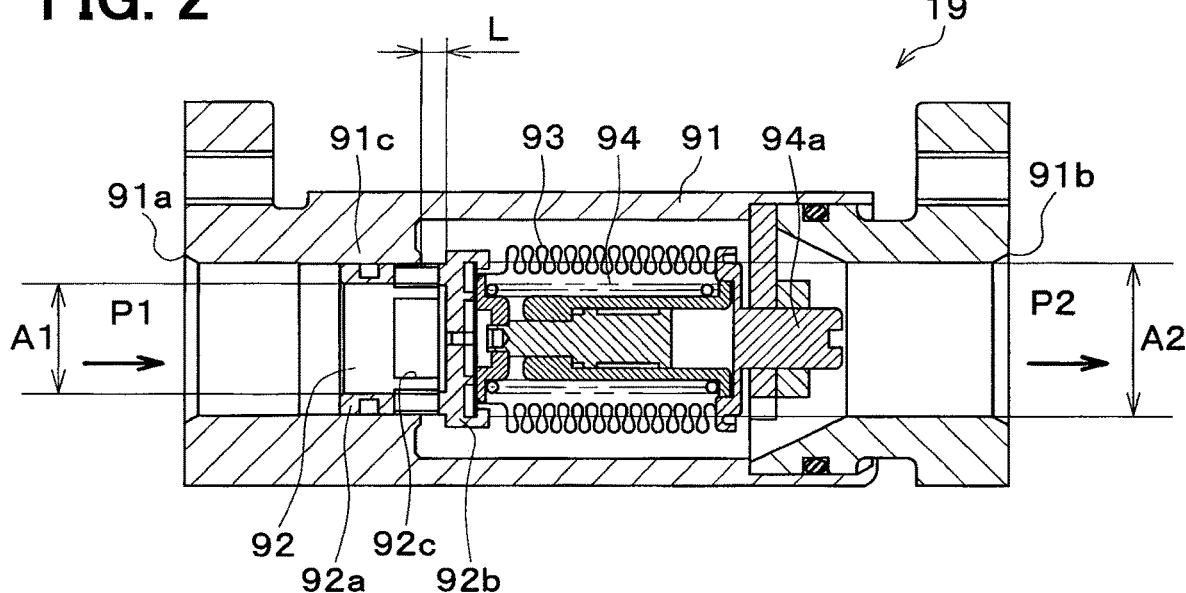
FIG. 2 is an axial sectional view of an evaporation-pressure control valve according to the first embodiment.

A structure of the evaporation-pressure control valve 19 will be described in greater detail hereafter with reference to FIG. 2. As shown in FIG. 2, the evaporation-pressure control valve 19 is formed of a mechanical mechanism including a housing 91, a valve body 92 having a tubular shape, a bellows 93, and a spring 94.

The housing 91 is formed of portions that are made of metal or resin and that are coupled integrally with each other. The housing 91 forms an outer shell of the evaporation-pressure control valve 19. The housing 91 defines a refrigerant passage therein in which the valve body 92, the bellows 93 and the spring 94.

The housing 91 having the tubular shape includes a first axial end and a second axial end facing each other along a longitudinal axis of the housing. The first axial end of the housing 91 is provided with an inflow port 91*a* connected to the refrigerant outlet of the interior evaporator 18. The second axial end of the housing 91 is provided with an outflow port 91*b* connected to an inlet of the accumulator 20. The evaporation-pressure control valve 19 further includes a cylinder portion 91*c* located downstream of the inflow port 91*a* along a flow direction of refrigerant flowing through the refrigerant passage in the housing 91.

The cylinder portion 91*c* defines a columnar space therein. The valve body 92 includes a tubular portion 92*a* having a shape that fit into the columnar space. The tubular portion 92*a* is housed in the cylinder portion 91*c* to be slidable in the cylinder portion 91*c* along the longitudinal axis of the housing 91. An outer diameter of the tubular portion 92*a* of the valve body 92 and an inner diameter of the cylinder portion 91*c* are set so that the tubular portion 92*a* is clearance-fitted into the cylinder portion 91*c*.

The valve body 92 is formed of a metal member having a bottomed tubular shape (i.e., a cup shape). The valve body 92 includes a first axial end and a second axial end along the longitudinal axis of the housing 91. The second end of the valve body 92 defines a bottom of the valve body 92 facing the outflow port 91*b*. A flange 92*b* protrudes from the second end of the valve body 92 along a direction perpendicular to the longitudinal axis of the housing 91. The flange 92*b* comes in contact with a downstream end of the cylinder portion 91*c* along the flow direction of refrigerant when the valve body 92 moves along the longitudinal axis. The flange 92*b* restricts a displacement of the valve body 92 along the longitudinal axis when abutting on the downstream end of the cylinder portion 91*c*.

A side wall of the tubular portion 92*a* of the valve body 92 includes a plurality of communication holes 92*c*. Each of the communication holes 92*c* passes through the side wall of the tubular portion 92*a* so that an inside of the tubular portion 92*a* and an outside of the tubular portion 92*a* are in fluid communication with each other via the communication holes 92*c*.

When the valve body 92 moves toward the first axial end of the housing 91 and the flange 92*b* comes in contact with the downstream end of the cylinder portion 91*c*, an inner wall surface of the cylinder portion 91*c* closes the communication holes 92*c*. As such, when the flange 92*b* abuts on the downstream end of the cylinder portion 91*c*, the fluid communication between the inflow port 91*a* and the outflow port 91*b* is shut off.

When the valve body 92 with the flange 92*b* being in contact with the downstream end of the cylinder portion 91*c* moves toward a second axial end, the communication hole 92*c* formed in the tubular portion 92*a* of the valve body 92 is exposed on the cylinder portion 91*c*. As a result, the inflow port 91*a* and the outflow port 91*b* come in fluid communication with each other. A total area of areas of the communication holes 92*c* exposed on the cylinder portion 91*c* increases as a displacement amount L of the valve body 92 toward the second axial end of the housing 91 increases.

That is, the cylinder portion 91*c* and the valve body 92 of the evaporation-pressure control valve 19 form a slide valve. The valve body 92 changes a sectional area of the refrigerant passage defined in the evaporation-pressure control valve 19 when moving along the longitudinal axis of the housing 91. Each of the communication holes 92*c* has a substantially rectangular shape when viewed along a direction perpendicular to the longitudinal axis of the housing 91. As such, the sectional area of the refrigerant passage defined in the evaporation-pressure control valve 19 increases in proportion to an increase of the displacement amount L.

The bellows 93 is a hollow cylindrical member made of metal and is stretchable and shrinkable along displacement of the valve body 92. The bellows 93 applies a load to the valve body 92 to decrease the sectional area of the refrigerant passage defined in the evaporation-pressure control valve 19, in other words, toward the inflow port 91*a*. The bellows 93 is located downstream of the valve body 92 in the flow direction of refrigerant. The bellows 93 has a first axial end coupled to the second end having the flange 92*b* of the valve body 92. The bellows 93 has a second axial end fixed to the housing 91 via an intervening member.

The spring 94 is disposed in an internal space defined in the bellows 93. The spring 94 is a coil spring stretchable and shrinkable along the longitudinal axis of the housing 91 along which the valve body 92 slides. Similarly to the bellows 93, the spring 94 applies a load to the valve body 92 to decrease the sectional area of the refrigerant passage defined in the evaporation-pressure control valve 19. The load applied from the bellows 93 and the spring 94 to the valve body 92 is adjustable by an adjustment screw 94a.

The valve body 92 thus receives a load by pressure of the refrigerant flowing into the inflow port 91a, a load by pressure of the refrigerant flowing out of the outflow port 91b, and the loads from the bellows 93 and the spring 94. The pressure of the refrigerant flowing into the inflow port 91a corresponds to the evaporation pressure of the refrigerant in the interior evaporator 18. The pressure of the refrigerant flowing out of the outflow port 91b corresponds to refrigerant pressure at a suction port of the compressor 11 and can also be called internal refrigerant pressure of the accumulator 20.

When the valve body 92 moves to a position where these loads are balanced, a sectional area of a refrigerant passage defined in the evaporation-pressure control valve 19 is adjusted. The sectional area of a refrigerant passage defined in the evaporation-pressure control valve 19 corresponds to a total opening area of opening areas of the communication holes 92c.

More specifically, such balance of the loads applied to the valve body 92 is expressed by a formula F1 below.

$$P1 \times A1 + P2 \times A2 = K \times L + P2 \times A1 + F0 \tag{F1}$$

P1 represents a pressure of the refrigerant flowing into the inflow port 91a. P2 represents a pressure of the refrigerant flowing out of the outflow port 91b. A1 represents a surface area of the valve body 92 receiving a pressure. A2 is a surface area of the bellows 93 receiving a pressure. K represents a sum of a spring constant of the bellows 93 and a spring constant of the spring 94. L represents an amount of a displacement of the valve body 92. F0 represents an initial load of the bellows 93 and the spring 94 adjusted by the adjustment screw 94a.

The evaporation-pressure control valve 19 has the pressure receiving area A1 and the pressure receiving area A2 set to be substantially equal (A1≈A2), and the formula F1 can thus be modified to a formula F2 below.

$$P1 = K/A1 \times L + F0/A1 \tag{F2}$$

The formula F2 means that the pressure P1 of the refrigerant flowing into the inflow port 91a increases as the displacement amount L increases. In addition, as described above, the sectional area of the refrigerant passage defined in the evaporation-pressure control valve 19 increases as the displacement amount L increases. The increase in the sectional area of the refrigerant passage defined in the evaporation-pressure control valve 19 results in an increase in a flow rate of the refrigerant passing through the evaporation-pressure control valve 19.

That is, the evaporation-pressure control valve 19 has a pressure regulating property that increases the pressure P1 of the refrigerant flowing into the inflow port 91a as a flow rate of the refrigerant passing through the evaporation-pressure control valve 19 increases. In other words, the evaporation-pressure control valve 19 has a pressure regulating property that increases the evaporation pressure of the refrigerant in the interior evaporator 18 as the flow rate of the refrigerant flowing through the interior evaporator 18 increases. The flow rate of the refrigerant passing through the evaporation-pressure control valve 19 is equal to the flow rate of the refrigerant flowing through the interior evaporator 18. In the first embodiment, the pressure regulating property of the evaporation-pressure control valve 19 is set so that the evaporation pressure of the refrigerant in the interior evaporator 18 in the cooling mode becomes higher than or equal to the frosting suppressive pressure APe. The evaporation pressure of the refrigerant in the interior evaporator 18 is, i.e., the pressure Pe of the refrigerant at the low pressure.

In the air conditioner 1 for a vehicle, the flow rate Ge of the refrigerant passing through the evaporation-pressure control valve 19 is equal to a flow rate of the refrigerant passing through the interior evaporator 18 in the dehumidifying and heating mode. In the dehumidifying and heating mode, the flow rate passing through the interior evaporator 18 is set to be greater than a specified flow rate SGe that is a predetermined mass flow rate. While the flow rate Ge of the refrigerant is equal to a reference flow rate KGe, the evaporation-pressure control valve 19 adjusts the evaporation pressure of the refrigerant in the interior evaporator 18 to be equal to a reference evaporation pressure SPe. The reference evaporation pressure SPe is a control target value. Furthermore, the evaporation temperature Te of the refrigerant in the interior evaporator 18 while the evaporation pressure of the refrigerant in the interior evaporator 18 is equal to the reference evaporation pressure SPe will be referred to as a reference evaporation temperature STe hereinafter. The reference evaporation temperature STe is a temperature (e.g., 1° C.) at which the interior evaporator 18 does not get frosted.

As shown in FIG. 1, the evaporation-pressure control valve 19 has an outlet connected to the fourth three-way joint 13d. As described above, the fourth three-way joint 13d has another one of the flow gateways connected to the fourth refrigerant passage 14d. The fourth three-way joint 13d has still another one of the flow gateways connected to the inlet of the accumulator 20.

The accumulator 20 is a gas-liquid separator configured to cause separation between gas and liquid in the inflow refrigerant and accumulate an excess refrigerant in the cycle. The accumulator 20 has a gas-phase refrigerant outlet connected to a suction port of the compressor 11. As such, the accumulator 20 prevents a liquid-phase refrigerant from being drawn into the compressor 11 so that the compressor 11 is prevented from compressing the liquid-phase refrigerant.

The fourth refrigerant passage 14d connecting the second three-way joint 13b and the fourth three-way joint 13d is provided with the first switching valve 21. The first switching valve 21 is configured by an electromagnetic valve. The first switching valve 21 functions as a refrigeration circuit switcher configured to open or close the fourth refrigerant passage 14d to switch among the refrigeration circuits. The first switching valve 21 has operation controlled based on a control signal output from the air-conditioning controller 40.

Similarly, the second refrigerant passage 14b connecting the first three-way joint 13a and the third three-way joint 13c is provided with the second switching valve 22. Like the first switching valve 21, the second switching valve 22 is configured by an electromagnetic valve. The second switching valve 22 functions as a refrigeration circuit switcher configured to open or close the second refrigerant passage 14b to switch among the refrigeration circuits.

The interior air conditioning unit 30 shown in FIG. 1 will be described next. The interior air conditioning unit 30 sends, to the cabin, air having temperature regulated by the refrigeration cycle device 10. The interior air conditioning unit 30 is disposed inside an instrument panel located at a front end in the cabin. The interior air conditioning unit 30 includes the casing 31 serving as an outer shell and accommodating a blower 32, the interior evaporator 18, the interior condenser 12, and the like.

The casing 31 provides an air passage for the air sent to the cabin. The casing 31 is made of a resin having certain elasticity and excellent strength (e.g., polypropylene).

An inside-outside air switching device 33 is disposed in an upstream end area inside the casing 31 along the flow direction of air. The inside-outside air switching device 33 takes in inside air (i.e., air inside the cabin) and outside air (i.e., air outside the cabin) to the casing 31 at a required ratio.

Specifically, the inside-outside air switching device 33 has an inside air inlet taking in the inside air to the casing 31 and an outside air inlet taking in the outside air to the casing 31. The inside-outside air switching device 33 operates the inside-outside air switching door continuously to change an opening area of the inside air inlet and an opening area of the outside air inlet. As such, the inside-outside air switching device 33 continuously changes a ratio between a volume of the inside air and a volume of the outside air flowing into the casing 31. The inside-outside air switching door is driven by an electric actuator for the inside-outside air switching door. An operation of the electric actuator is controlled based on a control signal output from the air-conditioning controller 40. The inside-outside air switching device 33 serves as an inside-air ratio adjuster in the present disclosure.

The ratio of the inside air is a ratio of a volume of the inside air to an entire volume of air exchanging heat with the refrigerant in the interior evaporator 18. Specifically, the ratio of the inside air is a ratio of a volume of the inside air taken in from the inside air introduction port to a total volume of air (i.e., a sum of a volume of the inside air and a volume of the outside air) flowing into the cabin from the inside-outside air switching device 33.

The blower 32 is located downstream of the inside-outside air switching device 33 along the flow direction of air. The blower 32 draws air via the inside-outside air switching device 33 and discharges the air toward the cabin. The blower 32 is an electric blower including a centrifugal multi-vane fan (e.g., a sirocco fan) driven by an electric motor. A rotational speed of the blower 32 is controlled based on a control voltage output from the air-conditioning controller 40. In other words, a ventilation level of the blower 32 (or a volume of air discharged from the blower 32) is controlled based on the control voltage.

The interior evaporator 18 and the interior condenser 12 are located downstream of the blower 32 along the flow direction of air. The interior evaporator 18 and the interior condenser 12 are arranged in this order from an upstream side to a downstream side along the flow direction of air. In other words, the interior evaporator 18 is located upstream of the interior condenser 12 along the flow direction of air.

The casing 31 is provided therein with a cool-air bypass passage 35. The cool-air bypass passage 35 allows the air having passed through the interior evaporator 18 to flow downstream while bypassing the interior condenser 12.

An air mix door 34 is located downstream of the interior evaporator 18 along the flow direction of air and upstream of the interior condenser 12 along the flow direction of air. The air mix door 34 divides a flow of air after passing through the interior evaporator 18 to change a flow rate of the air flowing into the interior condenser 12.

A mixing space is defined on a downstream side of the interior condenser 12 along the flow direction of air. In the mixing space, the air heated in the interior condenser 12 and the air not heated in the interior condenser 12 by passing through the cool-air bypass passage 35 are mixed with each other. A downstream end portion of the casing 31 along the flow direction of air is provided with a plurality of openings. The mixed air (i.e., conditioned air) of the heated air and the non-heated air mixed in the mixing space flows into the cabin as an air conditioning target space via the openings.

The openings specifically include a face opening, a foot opening, and a defroster opening (none shown). The face opening allows conditioned air to be sent toward an upper body of a crew in the cabin. The foot opening allows conditioned air to be sent toward feet of the crew in the cabin. The defroster opening allows conditioned air to be sent toward an inner side surface of a vehicle windshield.

A downstream end of the face opening along the flow direction of air is connected, via a duct defining an air passage therein through which the conditioned air flows, to a face outlet (not shown) opening to the cabin. A downstream end of the foot opening along the flow direction of air is connected, via a duct defining an air passage therein through which the conditioned air flows, to a foot outlet (not shown) opening to the cabin. A downstream end of the defroster opening along the flow direction of air is connected, via a duct defining an air passage therein through which the conditioned air flows, to a defroster outlet (not shown) opening to the cabin.

When the air mix door 34 regulates the volume ratio between the air passing through the interior condenser 12 and the air passing through the cool-air bypass passage 35, temperature of the conditioned air mixed in the mixing space is regulated to achieve regulation of the conditioned air sent out of the air outlets to the cabin.

The air mix door 34 accordingly functions as a temperature regulator configured to regulate temperature of conditioned air to be sent to the cabin. The air mix door 34 is driven by an electric actuator configured to drive the air mix door. The electric actuator has operation controlled based on a control signal output from the air-conditioning controller 40.

A face door (not shown) adjusting an opening area of the face opening is located upstream of the face opening along the flow direction of air. A foot door (not shown) adjusting an opening area of the foot opening is located upstream of the foot opening along the flow direction of air. A defroster door (not shown) adjusting an opening area of the defroster opening is located upstream of the defroster opening along the flow direction of air.

The face door, the foot door, and the defroster door form an air outlet mode switching door that sets air outlet modes. The face door, the foot door, and the defroster door are connected to an electric actuator for the air outlet mode switching door via a link mechanism. The link mechanism rotates the face door, the foot door, and the defroster door to coordinate with each other. An operation of the electric actuator is controlled based on a control signal output from the air-conditioning controller 40.

Specific examples of the air outlet modes achieved by means of the air outlet mode switching door include a face mode, a bi-level mode, and a foot mode.

The face mode is an air outlet mode of sending air out of the face outlet being fully opened toward the upper body of the crew in the cabin. The bi-level mode is an air outlet mode of sending air out of the face outlet and the foot outlet both being opened toward the upper body and the feet of the crew in the cabin. The foot mode is an air outlet mode of sending air out of the foot outlet being fully opened toward the feet of the crew in the cabin.

The crew can further manually operate an air sending mode switch provided at an operation panel 60 to achieve a defroster mode. The defroster mode is an air outlet mode of sending air out of the defroster outlet being fully opened toward the inner surface of the vehicle windshield.

Figure 3:
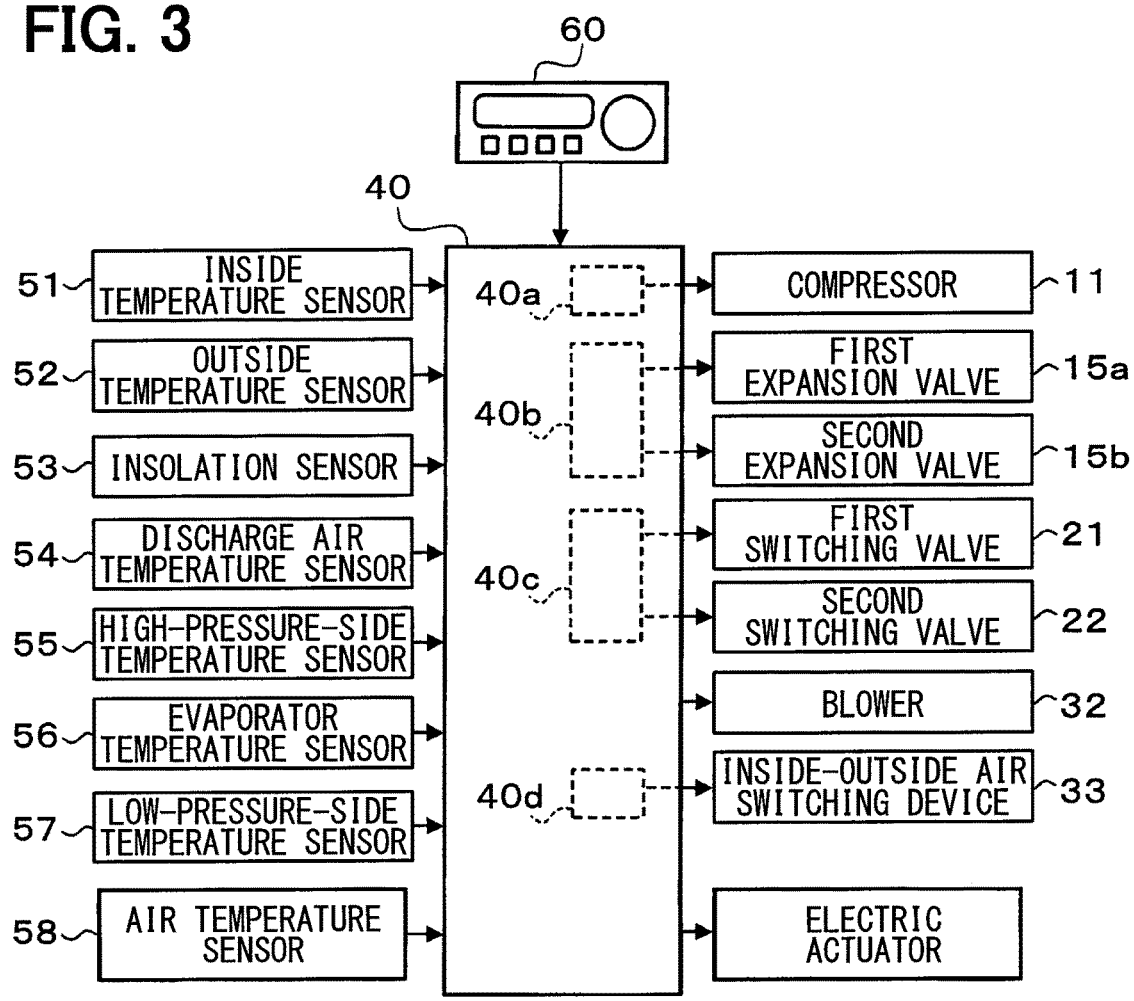
FIG. 3 is a block diagram depicting a control system of the air conditioner according to the first embodiment.

The air conditioner 1 for a vehicle will be described next in terms of its control system with reference to FIG. 3. The air conditioner 1 for a vehicle includes the air-conditioning controller 40 configured to control equipment configuring the refrigeration cycle device 10 and control the interior air conditioning unit 30.

The air-conditioning controller 40 is configured by a well-known microcomputer including a CPU, a ROM, a RAM, and the like, and a peripheral circuit thereof. The air-conditioning controller 40 executes various arithmetic operation and processing in accordance with a control program stored in the ROM, to control operation of air conditioning control equipment connected to an output end, such as the compressor 11, the first expansion valve 15a, the second expansion valve 15b, the first switching valve 21, the second switching valve 22, the blower 32, and the inside-outside air switching device 33.

The air-conditioning controller 40 has an input end to receive detection signals from air conditioning control sensors. As shown in FIG. 3, the air conditioning control sensors include an inside air temperature sensor 51, an outside air temperature sensor 52, a solar sensor 53, a discharge temperature sensor 54, a pressure sensor 55 on the high pressure side, an evaporator temperature sensor 56, a pressure sensor 57 on the low pressure side, an air temperature sensor 58, and the like.

The inside air temperature sensor 51 is an inside air detector configured to detect a temperature Tr (i.e., an inside air temperature) of the inside air in the cabin. The outside air temperature sensor 52 is an outside air detector configured to detect a temperature Tam (i.e., an outside air temperature) of the outside air outside the cabin. The solar sensor 53 is an insolation detector configured to detect an insolation amount As of solar radiation to the cabin. The discharge temperature sensor 54 is a discharge temperature detector configured to detect a discharged refrigerant temperature Td of the refrigerant discharged from the compressor 11.

The pressure sensor 55 on the high pressure side is a pressure detector on the high pressure side. The pressure sensor 55 detects the pressure Pd (i.e., a high-pressure-side pressure) of the refrigerant at the high pressure at an outlet of the interior condenser 12. In the heating mode, the pressure Pd of the refrigerant at the high pressure corresponds to a pressure of the refrigerant flowing from the discharge port of the compressor 11 to an inlet of the first expansion valve 15a. In the dehumidifying and heating mode, the pressure Pd of the refrigerant at the high pressure corresponds to a pressure of the refrigerant flowing from the discharge port of the compressor 11 to an inlet of the first expansion valve 15a and an inlet of the second expansion valve 15b. In the cooling mode, the pressure Pd of the refrigerant at the high pressure corresponds to a pressure of the refrigerant flowing from the discharge port of the compressor 11 to the inlet of the second expansion valve 15b.

The evaporator temperature sensor 56 is an evaporator temperature detector configured to detect the evaporating temperature Te (i.e., an evaporator temperature) of the refrigerant in the interior evaporator 18. The evaporator temperature sensor 56 detects temperature of a heat exchange fin of the interior evaporator 18. Examples of the evaporator temperature sensor 56 include a temperature detector configured to detect temperature of a different portion in the interior evaporator 18. The examples of the evaporator temperature sensor 56 also include a temperature detector configured to directly detect temperature of the refrigerant itself flowing through the interior evaporator 18.

The pressure sensor 57 on the low pressure side is a pressure detector on the low pressure side. The pressure sensor 57 detects the pressure Pe (i.e., a low-pressure-side pressure) of the refrigerant at the low pressure at an outlet of the interior evaporator 18. In the cooling mode and the dehumidifying and heating mode, the pressure Pe of the refrigerant at the low pressure is equal to the evaporation pressure of the refrigerant in the interior evaporator 18. The air temperature sensor 58 is an air temperature detector configured to detect an air temperature TAV of air sent from the mixing space to the cabin.

The input end of the air-conditioning controller 40 is connected to the operation panel 60 disposed adjacent to the instrument panel in a front portion of the cabin. The air-conditioning controller 40 accordingly receives operation signals from various air conditioning operation switches provided in the operation panel 60.

Specific examples of the various air conditioning operation switches provided in the operation panel 60 include an automatic switch, a cooling switch (A/C switch), an air volume setting switch, a temperature setting switch, and the air sending mode switch.

The automatic switch is an input unit operated to set or cancel automatic control operation of the air conditioner 1 for a vehicle. The cooling switch is an input unit operated to request cooling the cabin. The air volume setting switch is an input unit operated to manually set air volume of the blower 32. The temperature setting switch is an input unit operated to set cabin set temperature Tset as target temperature of the cabin. The air sending mode switch is an input unit operated to manually set an air sending mode.

The air-conditioning controller 40 is integrally formed of various control circuits for controlling various devices in the air conditioner 1. The control circuits are connected to an output side of the air-conditioning controller 40. The control circuits with a structure (i.e., hardware and software) form various controllers configured to control the devices.

As an example, the air-conditioning controller 40 includes a control circuit that serves as a discharge capacity controller 40a controlling the operation of the controller 11. The air-conditioning controller 40 includes a control circuit serving as a refrigeration circuit controller 40b that controls the operations of the first switching valve 21, the second switching valve 22, or the like forming a refrigeration circuit switching device.

The air-conditioning controller 40 includes a control circuit that serves as a decompressor controller 40c controlling the operation of the first expansion valve 15a as a first decompressor and the operation of the second expansion valve 15b as a second decompressor. The air-conditioning controller 40 includes a control circuit that serves as an inside-air ratio controller 40d controlling the operation of the electric actuator for the inside-outside air switching door of the inside-outside air switching device 33. The inside-outside air switching device 33 serves as the inside-air ratio adjuster. The discharge capacity controller 40a, the refrigeration circuit controller 40b, the decompressor controller 40c, or the inside-air ratio controller 40d may be formed separately from the air-conditioning controller 40.

Operations of the air conditioner 1 for a vehicle in the first embodiment will be described with reference to FIG. 4, FIG. 5, FIG. 6 and FIG. 7. As described above, the air conditioner 1 for a vehicle sets various operation modes including the heating mode, the dehumidifying and heating mode, and the cooling mode. The air conditioner 1 for a vehicle sets the operation modes by executing an air-conditioning control program that is stored in the air-conditioning controller 40 in advance.

Figure 4:
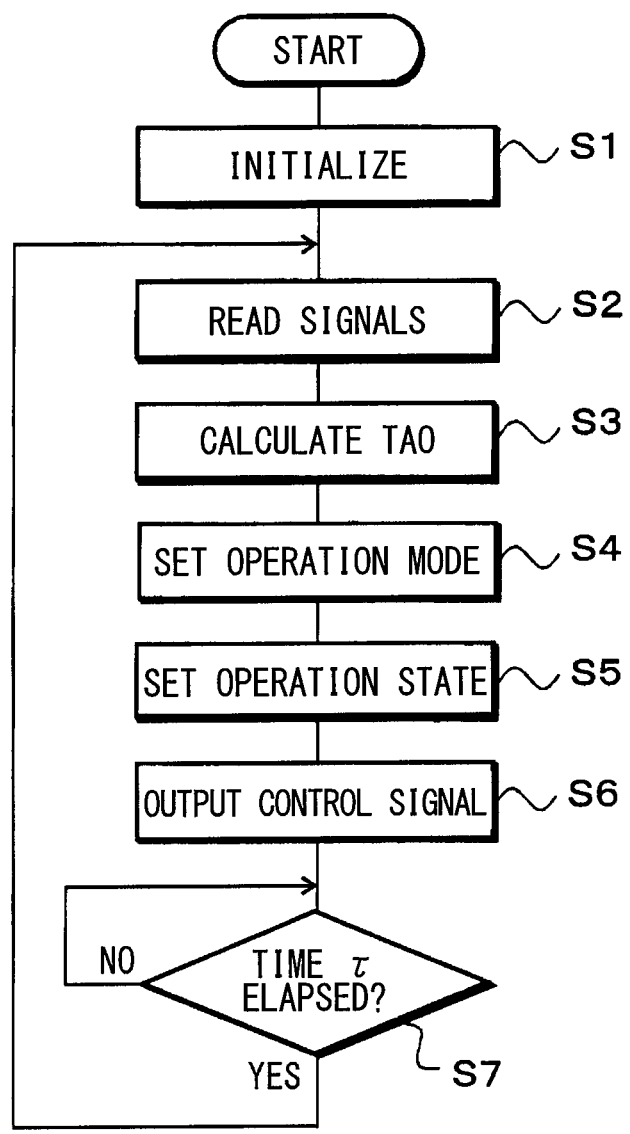
FIG. 4 is a flowchart depicting control processing executed by the air conditioner according to the first embodiment.
Figure 5:
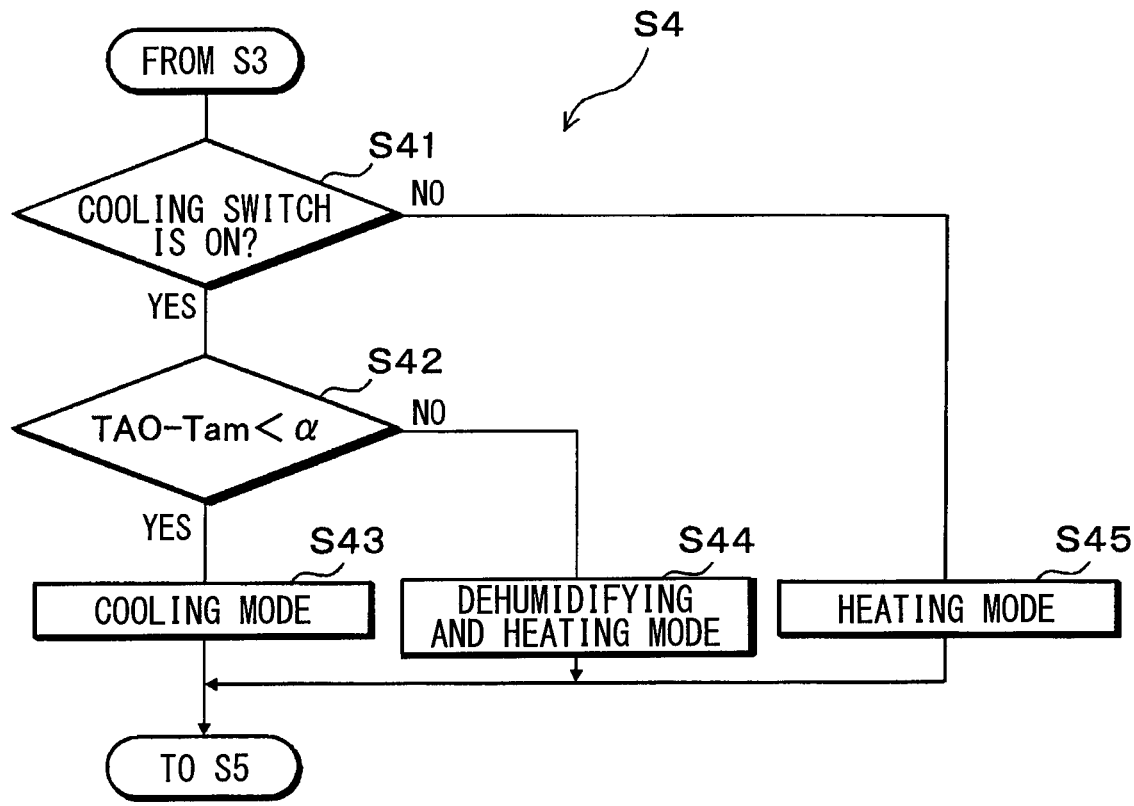
FIG. 5 is a flowchart depicting a subroutine of determining an operation mode in the control processing executed by the air conditioner according to the first embodiment.
Figure 6:
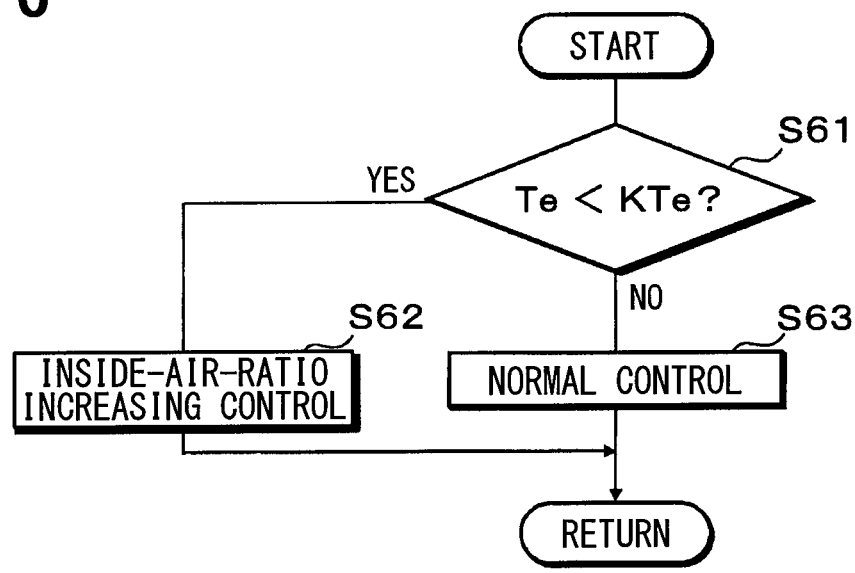
FIG. 6 is a flowchart depicting a subroutine executed during a dehumidifying and heating mode in the control processing executed by the air conditioner according to the first embodiment.

FIG. 4 is a flowchart of control processing as main routine of the air conditioning control program. The control processing as the main routine is executed when the automatic switch in the operation panel 60 is ON. FIGS. 4 to 6 are flowcharts of control processing configuring various function implementation units included in the air-conditioning controller 40.

As shown in FIG. 4, the air conditioner 1 for a vehicle is initialized at 51. The initialization specifically includes initializing a flag, a timer, and the like configured by a storage circuit included in the air-conditioning controller 40, and locating, at an initial position, a stepping motor configuring each of the various electric actuators.

The initialization at 51 may also include reading out a value stored when the air conditioner for a vehicle previously stops or a vehicle system previously ends, out of the flag and an arithmetic operation value.

Subsequent S2 includes reading detection signals from the air conditioning control sensors, an operation signal from the operation panel 60, and the like.

Subsequent S3 includes calculating a target air temperature TAO as target temperature of air sent to the cabin, in accordance with the detection signals and the operation signal read at S2.

Specifically, the target air temperature TAO is calculated in accordance with a formula F3 below.

$$TAO = Kset \times Tset - Kr \times Tr - Kam \times Tam - Ks \times As + C \quad (F3)$$

Tset represents a set temperature of air inside the cabin that is sets by a temperature setting switch. Tr represents the temperature (i.e., the inside air temperature) of the inside air detected by the inside air temperature sensor 51. Tam represents the temperature (i.e., the outside air temperature) of the outside air detected by the outside air temperature sensor 52. As represents the insolation amount detected by the solar sensor 53. Kset, Kr, Kam, and Ks represent control gains. C represents a correction constant.

Subsequent S4 includes determining the operation mode. More specifically, S4 includes executing a subroutine shown in FIG. 5. Initial S41 includes determining whether or not the cooling switch in the operation panel 60 is ON. The control flow proceeds to S42 in a case where the cooling switch is determined as being ON at S41.

In another case where the cooling switch is determined as not being ON (being OFF) at S41, the control flow proceeds to S45 in which the heating mode is determined as the operation mode, and then proceeds to S5.

At S42, it is determined that a value obtained by subtracting the temperature Tam of the outside air from the target air temperature TAO (i.e., the value=TAO−Tam) is lower than a reference cooling temperature α. The reference cooling temperature α is set in advance. The reference cooling temperature α is 0° C. in the present embodiment.

In a case where (TAO− Tam)<α is established at S42, the control flow proceeds to S43 in which the cooling mode is determined as the operation mode, and then proceeds to S5. In another case where (TAO− Tam)<α is not established at S42, the control flow proceeds to S44 in which the dehumidifying and heating mode is determined as the operation mode, and then proceeds to S5.

S5 in FIG. 4 includes determining actuation states of various control target equipment in accordance with the operation mode determined at S4. More specifically, S5 includes determining on-off states of the first switching valve 21 and the second switching valve 22, an opening degree of the air mix door 34, and the actuation states of the first expansion valve 15a and the second expansion valve 15b, as indicated in a chart of FIG. 7.

Though not indicated in the chart of FIG. 7, S5 further includes determining refrigerant discharge capability of the compressor 11 (i.e., rotational speed of the compressor 11), ventilation capability of the blower 32 (i.e., rotational speed of the blower 32), an actuation state of the inside-outside air switching device 33, and an actuation state of the air outlet mode switching door (i.e., the air outlet mode).

In S6, the air-conditioning controller 40 outputs a control signal or control voltage to each of the air conditioning control equipment to achieve the actuation state of each of the air conditioning control equipment determined at S5. Subsequent S7 includes standing by for a control period T, and the control flow returns to S2 when elapse of the control period T is determined.

The air conditioner 1 for a vehicle has the operation mode determined as described above, and operates in the determined operation mode. Operation in each of the operation modes will be described below.

(a) Heating Mode

As indicated in the chart of FIG. 7, the air-conditioning controller 40 in the heating mode opens the first switching valve 21 and closes the second switching valve 22. The air-conditioning controller 40 further throttles the first expansion valve 15a for exertion of decompressing effect, and fully closes the second expansion valve 15b.

As such, in the heating mode, a vapor compression refrigeration circuit is set so that the refrigerant circulates therein as shown by black thick arrows. That is, the refrigerant passes through the compressor 11, the interior condenser 12, the first expansion valve 15a, the exterior heat exchanger 16, (the first switching valve 21,) and the accumulator 20 in this order and returns to the compressor 11 after flowing out of the accumulator 20.

As described above at S5, the air-conditioning controller 40 having the refrigeration circuit thus configured determines the actuation state of each of the air conditioning control equipment (a control signal output to each of the air conditioning control equipment) in the heating mode.

As an example, a control signal output to an electric motor of the compressor 11 may be set in a manner given below. A target condensing pressure PCO at which the refrigerant is condensed in the interior condenser 12 is set based on the target air temperature TAO with reference to a control map stored in the air-conditioning controller 40. The control map is provided to increase the target condensing pressure PCO as the target air temperature TAO rises.

The control signal output to the electric motor for the compressor 11 is set using a feedback control so that the pressure Pd of the refrigerant at the high pressure approaches the target condensing pressure PCO. More specifically, the control signal output to the electric motor for the compressor 11 is set based on a deviation between the target condensing pressure PCO and the pressure Pd of the refrigerant at the high pressure detected by the pressure sensor 55.

A control signal output to the electric actuator configured to drive the air mix door is determined such that the air mix door 34 fully closes the cool-air bypass passage 35 and entire air having passed through the interior evaporator 18 passes through an air passage adjacent to the interior condenser 12.

The control signal output to the first expansion valve 15a is determined such that the refrigerant flowing into the first expansion valve 15a has a subcooling degree approaching a target subcooling degree. The target subcooling degree has a value determined to have a maximum coefficient of performance (COP) in the cycle.

A control voltage output to the electric motor of the blower 32 is determined based on the target air temperature TAO with reference to the control map stored in the air-conditioning controller 40 in advance. In the control map, the ventilation level of the blower 32 becomes maximum when the target air temperature TAO falls within an extremely low temperature range (i.e., maximally cooled range) or in an extremely high temperature range (i.e., maximally heated range).

Furthermore, the ventilation level of the blower 32 decreases as the target air temperature TAO increases from the extremely low temperature range toward an intermediate temperature range, and the ventilation level of the blower 32 decreases as the target air temperature TAO decreases from the extremely high temperature range toward the intermediate temperature range. The ventilation level of the blower 32 is minimized when the target air temperature TAO falls in the intermediate temperature range.

A control signal output to the electric actuator of the inside-outside air switching door is determined based on the target air temperature TAO with reference to a control map stored in the air-conditioning controller 40 in advance. In the control map, an outside air mode taking in the outside air from the inside-outside air switching door is set basically. When the target air temperature TAO is within the extremely high temperature range and the heating performance is required to be operated to heat the air drastically, an inside air mode taking in the inside air from the inside-outside air switching door is set.

A control signal output to the electric actuator of the air outlet door is determined based on the target air temperature TAO with reference to a control map stored in the air-conditioning controller 40 in advance. In the control map, the air outlet modes shift in an order of the foot mode, the bi-level mode, and the face mode as the target air temperature TAO falls from a high temperature range toward a low temperature range.

In the refrigeration cycle device 10 in the heating mode, the refrigerant at a high pressure discharged from the compressor 11 flows into the interior condenser 12. The refrigerant having flowed into the interior condenser 12 exchanges heat with the air having been sent from the blower 32 and having passed through the interior evaporator 18 to radiate heat because the air mix door 34 opens the air passage adjacent to the interior condenser 12. The air is accordingly heated.

The refrigerant having flowed out of the interior condenser 12 flows from the first three-way joint 13a toward the first refrigerant passage 14a because the second switching valve 22 is closed, so as to be decompressed in the first expansion valve 15a to become the refrigerant at a low pressure. The refrigerant at the low pressure obtained through decompression in the first expansion valve 15a flows into the exterior heat exchanger 16 and absorbs heat from the outside air sent from the blower fan.

Because the first switching valve 21 is opened and the second expansion valve 15b is fully closed, the refrigerant having flowed out of the exterior heat exchanger 16 flows from the second three-way joint 13b toward the fourth refrigerant passage 14d, and flows into the accumulator 20 via the fourth three-way joint 13d to be separated into gas and liquid. The gas-phase refrigerant separated in the accumulator 20 is taken in from the suction port of the compressor 11 and is recompressed in the compressor 11.

As described above, the heating mode allows the air heated in the interior condenser 12 to flow into the cabin to heat the cabin.

(b) Dehumidifying and Heating Mode

As indicated in the chart of FIG. 7, the air-conditioning controller 40 in the dehumidifying and heating mode opens the first switching valve 21, opens the second switching valve 22, throttles the first expansion valve 15a, and throttles the second expansion valve 15b.

As such, in the heating mode, a vapor compression refrigeration circuit is set so that the refrigerant circulates therein as shown by shaded arrows. That is, the refrigerant passes through the compressor 11, the interior condenser 12, the first expansion valve 15a, the exterior heat exchanger 16, (the first switching valve 21,) and the accumulator 20 in this order and returns to the compressor 11 after flowing out of the accumulator 20. At the same time, the refrigerant passes through the compressor 11, the interior condenser 12, (the second switching valve 22,) the second expansion valve 15b, the interior evaporator 18, the evaporation-pressure control valve 19, and the accumulator 20 in this order and returns to the compressor 11 after flowing out of the accumulator 20.

More specifically, in the dehumidifying and heating mode, the refrigeration circuit is set so that a flow of the refrigerant flowing out of the interior condenser 12 is divided into a first flow of the refrigerant and a second flow of the refrigerant in the first three-way joint 13a. In the first flow, the refrigerant flowing out of the first three-way joint 13a flows through the first expansion valve 15a, the exterior heat exchanger 16, and the compressor 11 in this order. In the second flow, the refrigerant flowing out of the first three-way joint 13a flows through the second expansion valve 15b, the interior evaporator 18, the evaporation-pressure control valve 19, and the compressor 11 in this order.

As described above at S5, the air-conditioning controller 40 having the refrigeration circuit thus configured determines the actuation state of each of the air conditioning control equipment in the dehumidifying and heating mode.

For example, the control signal output to the electric motor of the compressor 11 is determined as in the heating mode. The control signal output to the electric actuator configured to drive the air mix door is determined such that, as in the heating mode, the air mix door 34 fully closes the cool-air bypass passage 35 and entire air having passed through the interior evaporator 18 passes through the air passage adjacent to the interior condenser 12.

The control signal output to the first expansion valve 15a is determined such that, as in the heating mode, the refrigerant flowing into the first expansion valve 15a has a subcooling degree approaching the target subcooling degree determined to have a substantially maximum coefficient of performance (COP) in the cycle.

A control signal output to the second expansion valve 15b is determined so that the flow rate of the refrigerant flowing through the interior evaporator 18 becomes an appropriate flow rate. Specifically, the opening degree of the second expansion valve 15b is adjusted so that a degree of superheat of the refrigerant at the outlet of the interior evaporator 18 becomes a reference degree (e.g., 5° C.) set in advance.

The control voltage output to the electric motor of the blower 32 is determined as in the heating mode. The control signal output to the electric actuator configured to drive the air outlet door is determined as in the heating mode.

The control signal output to the electric actuator for the inside-outside air switching door of the inside-outside air switching device 33 is initially set to a control signal requesting to take in the outside air, i.e., requesting to set the ratio of the inside air to a minimum ratio. Subsequently, the subroutine shown in FIG. 6 is executed to set the control signal output to the electric actuator for the inside-outside air switching door based on a factor such as the evaporation temperature Te of the refrigerant in the interior evaporator 18 or the target air temperature TAO. The evaporator temperature sensor 56 detects the evaporation temperature Te of the refrigerant in the interior evaporator 18.

First, the air-conditioning controller 40 determines whether the evaporation temperature Te of the refrigerant detected by the evaporator temperature sensor 56 is lower than the reference evaporation temperature KTe at S61 as shown in FIG. 6. As an example, the reference evaporation temperature KTe may be set to a temperature (e.g., 1° C.) at which the interior evaporator 18 does not get frosted.

In a case where the evaporation temperature Te of the refrigerant is determined as being less than the reference evaporation temperature KTe at S61, the control flow proceeds to S62 to perform an air ratio increasing control in which a flow rate of the inside air is increased.

When the evaporation temperature Te of the refrigerant is lower than the reference evaporation temperature KTe, it may mean that the air is dehumidified with the dehumidification performance at a level lower than a maximum level. In other words, the interior evaporator 18 is capable of dehumidifying the air more strongly. As such, the amount of heat absorbed by the refrigerant from the air in the interior evaporator 18 can be increased by increasing the ratio of the inside air taken in from the inside-outside air switching device 33 without changing the current level of the dehumidification performance.

In the air ratio increasing control executed at S62, the control signal output to the electric actuator for the inside-outside air switching door is set to increase the ratio of the inside air as the evaporation temperature Te of the refrigerant detected by the evaporator temperature sensor 56 falls.

When the evaporation temperature Te of the refrigerant is determined to be higher than or equal to the reference evaporation temperature KTe at S61, the control flow advances to S63 and the ordinary control starts. In the ordinary control executed at S63, the control signal output to the electric actuator of the inside-outside air switching door is determined based on the target air temperature TAO with reference to a control map stored in the air-conditioning controller 40 in advance.

In the actuation state thus determined of each of the air conditioning control equipment, the refrigerant at the high pressure discharged from the compressor 11 flows into the interior condenser 12 in the refrigeration cycle device 10 in the dehumidifying and heating mode. The refrigerant having flowed into the interior condenser 12 exchanges heat with the air having been sent from the blower 32 and having passed through the interior evaporator 18 to radiate heat as in the heating mode, because the air mix door 34 opens the air passage adjacent to the interior condenser 12. The air is accordingly heated.

Since the second switching valve 22 is open, the first three-way joint 13a divides a flow of the refrigerant flowing out of the interior condenser 12 into a first flow of the refrigerant and a second flow of the refrigerant. The refrigerant in the first flow divided in the first three-way joint 13a flows into the first refrigerant passage 14a and flows into the first expansion valve 15a. The first expansion valve 15a reduces a pressure of the refrigerant so that the refrigerant becomes the refrigerant at a low pressure. The refrigerant at the low pressure decompressed in the first expansion valve 15a flows to the exterior heat exchanger 16 and absorbs heat in the exterior heat exchanger 16 from the outside air discharged from the blower fan.

On the other hand, the refrigerant in the second flow divided in the first three-way joint 13a flows into the second refrigerant passage 14b. The refrigerant in the second refrigerant passage 14b does not flows toward the exterior heat exchanger 16 due to the check valve 17 and flows into the second expansion valve 15b via the second switching valve 22 and the third three-way joint 13c.

The second expansion valve 15b reduces a pressure of the refrigerant so that the refrigerant becomes the refrigerant at a low pressure. The refrigerant at the low pressure decompressed in the second expansion valve 15b flows to the interior evaporator 18 and absorbs heat in the interior evaporator 18 from air discharged from the blower 32. As such, the interior evaporator 18 cools the air. The refrigerant flowing out of the interior evaporator 18 is decompressed in the evaporation-pressure control valve 19 to have a pressure equal to a pressure of the refrigerant flowing out of the exterior heat exchanger 16.

The refrigerant flowing out of the evaporation-pressure control valve 19 flows into the fourth three-way joint 13d and joins the refrigerant flowing from the exterior heat exchanger 16. The refrigerant mixed in the fourth three-way joint 13d flows into the accumulator 20 and is separated into a gas-phase refrigerant and a liquid-phase refrigerant. The gas-phase refrigerant separated in the accumulator 20 is taken in from the suction port of the compressor 11 and is compressed again in the compressor 11.

As described above, in the dehumidifying and heating mode, the air cooled and dehumidified in the interior evaporator 18 is reheated in the interior condenser 12. The reheated air flows into the cabin. As such, the cabin is dehumidified and heated.

In the first embodiment, the air-conditioning controller 40 executes the air ratio increasing control at S62 in the dehumidifying and heating mode to increase the amount of heat absorbed by the refrigerant from the air in the interior evaporator 18 depending on the evaporation temperature Te of the refrigerant. That is, the air conditioner 1 for a vehicle in the first embodiment improves the heating performance in the dehumidifying and heating mode as the amount of heat absorbed by the refrigerant from the air in the interior evaporator 18 rises.

As an example, the air conditioner 1 for a vehicle in the first embodiment improves the heating performance in the dehumidifying and heating mode by executing the air ratio increasing control even when the compression workload of the compressor 11 is fixed. That is, heating efficiency for heating the air in the dehumidifying and heating mode with respect to the compression workload of the compressor 11 is improved.

In other words, the compression workload required for the compressor 11 to obtain a certain level of the heating performance is reduced by executing the air ratio increasing control. As such, power consumption of the compressor 11 is reduced, and coefficient of performance (COP) in the refrigeration circuit is improved.

(c) Cooling Mode

As indicated in the chart of FIG. 7, the air-conditioning controller 40 in the cooling mode closes the first switching valve 21 and the second switching valve 22. The air-conditioning controller 40 fully opens the first expansion valve 15a and throttles the second expansion valve 15b.

As such, in the cooling mode, a vapor compression refrigeration circuit is set so that the refrigerant circulates therein as shown by hollow arrows. That is, the refrigerant passes through the compressor 11, the interior condenser 12, (the first expansion valve 15a,) the exterior heat exchanger 16, (the check valve 17,), the second expansion valve 15b, the interior evaporator 18, the evaporation-pressure control valve 19, and the accumulator 20 in this order and returns to the compressor 11 after flowing out of the accumulator 20.

As described above at S5, the air-conditioning controller 40 having the refrigeration circuit thus configured determines the actuation state of each of the air conditioning control equipment in the cooling mode.

As an example, a control signal output to an electric motor of the compressor 11 may be set in a manner given below. A target evaporation temperature TEO at which the refrigerant is evaporated in the interior evaporator 18 is set based on the target air temperature TAO with reference to a control map stored in the air-conditioning controller 40. The control map is provided to decrease the target evaporation temperature TEO as the target air temperature TAO falls. The target evaporation temperature TEO has a lower limit (e.g., 2° C.) to prevent the interior evaporator 18 from being frosted.

The control signal output to the electric motor of the compressor 11 is determined from a deviation between the target evaporation temperature TEO and the evaporation temperature Te of the refrigerant detected by the evaporator temperature sensor 56 in accordance with the feedback control technique such that the evaporation temperature Te of the refrigerant approaches the target evaporation temperature TEO.

The control signal output to the electric actuator for the air mix door 34 is determined such that the air mix door 34 fully opens the cool-air bypass passage 35 and entire air having passed through the interior evaporator 18 passes through the cool-air bypass passage 35. The opening degree of the air mix door 34 may alternatively be controlled in the cooling mode such that the air temperature TAV approaches the target air temperature TAO.

The control signal output to the second expansion valve 15b is determined such that the refrigerant flowing into the second expansion valve 15b has a subcooling degree approaching the target subcooling degree. The target subcooling degree has a value determined to have a maximum coefficient of performance (COP) in the cycle.

The control voltage output to the electric motor of the blower 32 is determined as in the heating mode or in the dehumidifying and heating mode. The control signal output to the electric actuator for the inside-outside air switching door is determined as in the heating mode. The control signal output to the electric actuator configured to drive the air outlet door is determined as in the heating mode or in the dehumidifying and heating mode.

In the refrigeration cycle device 10 in the cooling mode, the refrigerant at the high pressure discharged from the compressor 11 flows into the interior condenser 12. The air mix door 34 fully closes the air passage adjacent to the interior condenser 12 in this case, so that the refrigerant having flowed into the interior condenser 12 flows out of the interior condenser 12 with almost no heat exchange with air.

Because the second switching valve 22 is closed, the refrigerant having flowed out of the interior condenser 12 flows from the first three-way joint 13a toward the first refrigerant passage 14a and flows into the first expansion valve 15a. The first expansion valve 15a is fully opened, so that the refrigerant having flowed out of the interior condenser 12 flows into the exterior heat exchanger 16 without being decompressed in the first expansion valve 15a.

The refrigerant flowing into the exterior heat exchanger 16 absorbs heat in the exterior heat exchanger 16 from the outside air discharged from the blower fan. Since the first switching valve 21 is closed, the refrigerant flowing out of the exterior heat exchanger 16 flows into the third refrigerant passage 14c via the second three-way joint 13b and decompressed in the second expansion valve 15b to be the refrigerant at the low pressure.

The refrigerant at the low pressure decompressed in the second expansion valve 15b flows to the interior evaporator 18 and absorbs heat in the interior evaporator 18 from the air discharged from the blower 32. As such, the interior evaporator 18 cools the air. The refrigerant flowing out of the interior evaporator 18 flows into the accumulator 20 via the evaporation-pressure control valve 19 and is divided into the gas-phase refrigerant and the liquid-phase refrigerant. The gas-phase refrigerant separated in the accumulator 20 is drawn into the compressor 11 form the suction port and is compressed again in the compressor 11.

Thus, in the cooling mode, the cabin is cooled by supplying the cooled air cooled in the interior evaporator 18 into the cabin.

The air conditioner 1 for a vehicle according to the present embodiment can thus appropriately condition air in the cabin through switching operation among the heating mode, the dehumidifying and heating mode, and the cooling mode.

Generally, in refrigeration cycle devices configured to set various refrigeration circuits as in the first embodiment, appropriate flow rates of the refrigerant circulating in the refrigeration circuits are different from each other among various operation modes. As an example, in the refrigeration cycle device 10, the interior evaporator 18 and the exterior heat exchanger 16 are connected in parallel with each other respect to the flow direction of refrigerant in the dehumidifying and heating mode. As such, a flow rate of the refrigerant flowing through the interior evaporator 18 in the cooling mode is greater than a flow rate of the refrigerant flowing through the interior evaporator 18 in the dehumidifying and heating mode.

In addition, the evaporation-pressure control valve 19 in the present embodiment has the pressure regulating property that increases the evaporation pressure of the refrigerant as a flow rate of the refrigerant flowing through the evaporation-pressure control valve 19 increases. In other words, the evaporation-pressure control valve 19 in the present embodiment increases the pressure Pe of the refrigerant at the low pressure as the flow rate Ge of the refrigerant flowing through the interior evaporator 18 increases.

Figure 8:
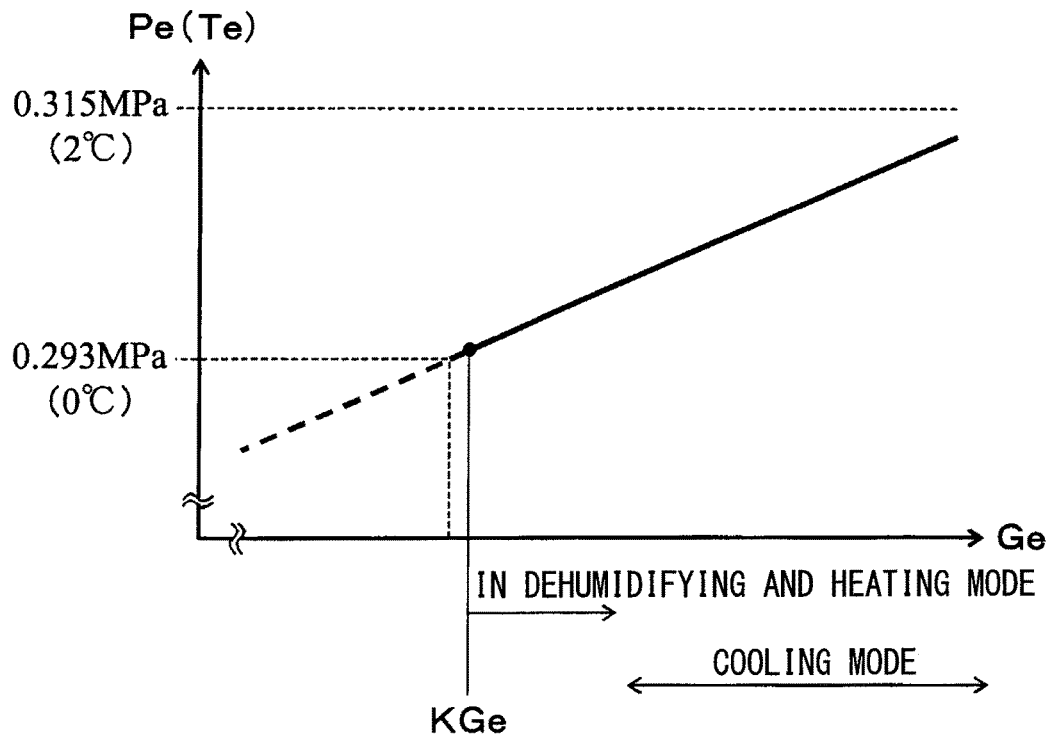
FIG. 8 is an explanatory graph of a pressure regulating property of the evaporation-pressure control valve according to the first embodiment.

More specifically, the pressure regulating property of the evaporation-pressure control valve 19 according to the present embodiment is set as indicated by a thick solid line and a thick dashed line in FIG. 8.

That is, within a range of the flow rate Ge of the refrigerant in the cooling mode, the pressure Pe of the refrigerant at the low pressure is kept to be higher than the frosting suppressive pressure APe even when the flow rate of the refrigerant becomes a minimum flow rate of the refrigerant in the cooling mode as shown by thick solid line in FIG. 8. As an example, the frosting suppressive pressure APe is slightly higher than 0.293 MPa. As such, the evaporation-pressure control valve 19 controls the evaporation temperature Te of the refrigerant to be a minimum value of the target evaporation temperature TEO even when the flow rate of the refrigerant is the minimum flow rate of the refrigerant in the cooling mode. As an example, the target evaporation temperature TEO may be 2° C. when being minimum.

However, the evaporation-pressure control valve 19 in the first embodiment would decrease the pressure Pe of the refrigerant at the low pressure in the interior evaporator 18 below the frosting suppressive pressure APe as shown by thick solid line in FIG. 8. Especially, the pressure Pe of the refrigerant at the low pressure would be decreased below the frosting suppressive pressure APe in the dehumidifying and heating mode in which the flow rate of the refrigerant passing through the interior evaporator 18 decreases below the flow rate of the refrigerant passing through the interior evaporator 18 in the cooling mode. When the pressure Pe of the refrigerant at the low pressure would be decreased below the frosting suppressive pressure APe, a frost would be formed in the interior evaporator 18. That is, when the evaporation temperature Te of the refrigerant is determined to be lower than the reference evaporation temperature KTe at S61 in FIG. 6, a frost would be formed in the interior evaporator 18.

Therefore, the air conditioner 1 for a vehicle in the first embodiment executes the air ratio increasing control at S62 when determining that the evaporation temperature Te of the refrigerant in the interior evaporator 18 is lower than the reference evaporation temperature KTe in the dehumidifying and heating mode.

In the air ratio increasing control, the inside-outside air switching device 33 is controlled to increase the ratio of the inside air as the evaporation temperature Te of the refrigerant falls. The increase in the ratio of the inside air results in an increase in a dehumidification load of the interior evaporator 18. The increase in the dehumidification load results in an increase in the amount of heat absorbed by the refrigerant from the air in the interior evaporator 18. As such, the flow rate Ge of the refrigerant flowing through the interior evaporator 18 increases, and the pressure Pe of the refrigerant at the low pressure and the evaporation temperature Te of the refrigerant in the interior evaporator 18 increase due to the pressure regulating property of the evaporation-pressure control valve 19.

Thus, by executing the air ratio increasing control in the dehumidifying and heating mode, the evaporation temperature Te of the refrigerant in the interior evaporator 18 is kept at a temperature at which the interior evaporator 18 is not frosted. As such, the interior evaporator 18 is prevented from being frosted. In addition, the flow rate Ge of the refrigerant flowing through the interior evaporator 18 is increased by performing the air ratio increasing control. As such, a refrigerant oil included in the refrigerant is prevented from being stagnated.

The air conditioner 1 for a vehicle can regulate the evaporation temperature Te of the refrigerant to have the minimum value (specifically, 2° C.) of the target evaporation temperature TEO when the refrigerant has a maximum flow rate in the cooling mode. The evaporation temperature Te of the refrigerant is decreased to reach the target evaporation temperature TEO, preventing control interference involving unnecessary increase in refrigerant discharge capability of the compressor 11.

This suppresses unnecessary increase in power consumption of the compressor 11 as well as insufficiency of air cooling capability of the interior evaporator 18.

As described above, the air conditioner 1 for a vehicle in the first embodiment performs the air ratio increasing control at S62 when the evaporation temperature Te of the refrigerant in the interior evaporator 18 is determined to be lower than the reference evaporation temperature KTe in the dehumidifying and heating mode. In the air ratio increasing control, the ratio of the inside air increases as the evaporation temperature Te of the refrigerant falls. As such, an amount of heat absorbed by the interior evaporator 18 increases. Therefore, a heating performance in the dehumidifying and heating mode is improved.

In the dehumidifying and heating mode, the air conditioner 1 for a vehicle improves the heating performance obtained with a specified compression workload of the compressor 1, i.e., improves the amount of heat radiated in the interior condenser 12. In other words, the air conditioner 1 for a vehicle reduces the compression workload required to the compressor 11 to obtain a certain level of the heating performance in the dehumidifying and heating mode. As a result, energy consumption is reduced.

That is, the refrigeration cycle device 10 improves efficiency relative to the heating performance in the dehumidifying and heating mode with respect to the compression workload of the compressor 1. In other words, the compression workload required for the compressor 1 to obtain a certain level of the heating performance is reduced.

In the first embodiment, the air conditioner 1 for a vehicle performs the cooling operation by setting the refrigeration circuit in the cooling mode. However, an appropriate flow rate of the refrigerant circulating in the refrigeration circuit in the cooling mode is different from an appropriate flow rate of the refrigerant circulating in a refrigeration circuit in the dehumidifying and heating mode. The difference between the appropriate flow rate in the cooling mode and the appropriate flow rate in the dehumidifying and heating mode would cause an abnormality. Then, the air conditioner 1 executes the air ratio increasing control to suppress the occurrence of the abnormality. As an example, the air conditioner 1 may suppress an occurrence of a frost formation in the interior evaporator 18, stagnation of refrigerant oil, or an interference in controls.

Second Embodiment

The second embodiment different from the first embodiment described above will be described next with reference to the drawings. The second embodiment provides the air conditioner 1 for a vehicle configured basically similarly to the air conditioner 1 according to the first embodiment. The second embodiment is different from the first embodiment in details of control through a subroutine executed in the dehumidifying and heating mode.

The following description accordingly includes the reference signs that are identical to those of the first embodiment and indicate the identical configurations described in the preceding description.

In the dehumidifying and heating mode in the second embodiment, a vapor compression refrigeration circuit is set to be the same as that in the first embodiment. That is, the refrigerant passes through the compressor 11, the interior condenser 12, the first expansion valve 15a, the exterior heat exchanger 16, (the first switching valve 21,) and the accumulator 20 in this order and returns to the compressor 11 after flowing out of the accumulator 20. At the same time, the refrigerant passes through the compressor 11, the interior condenser 12, (the second switching valve 22,) the second expansion valve 15b, the interior evaporator 18, the evaporation-pressure control valve 19, and the accumulator 20 in this order and returns to the compressor 11 after flowing out of the accumulator 20.

Figure 9:
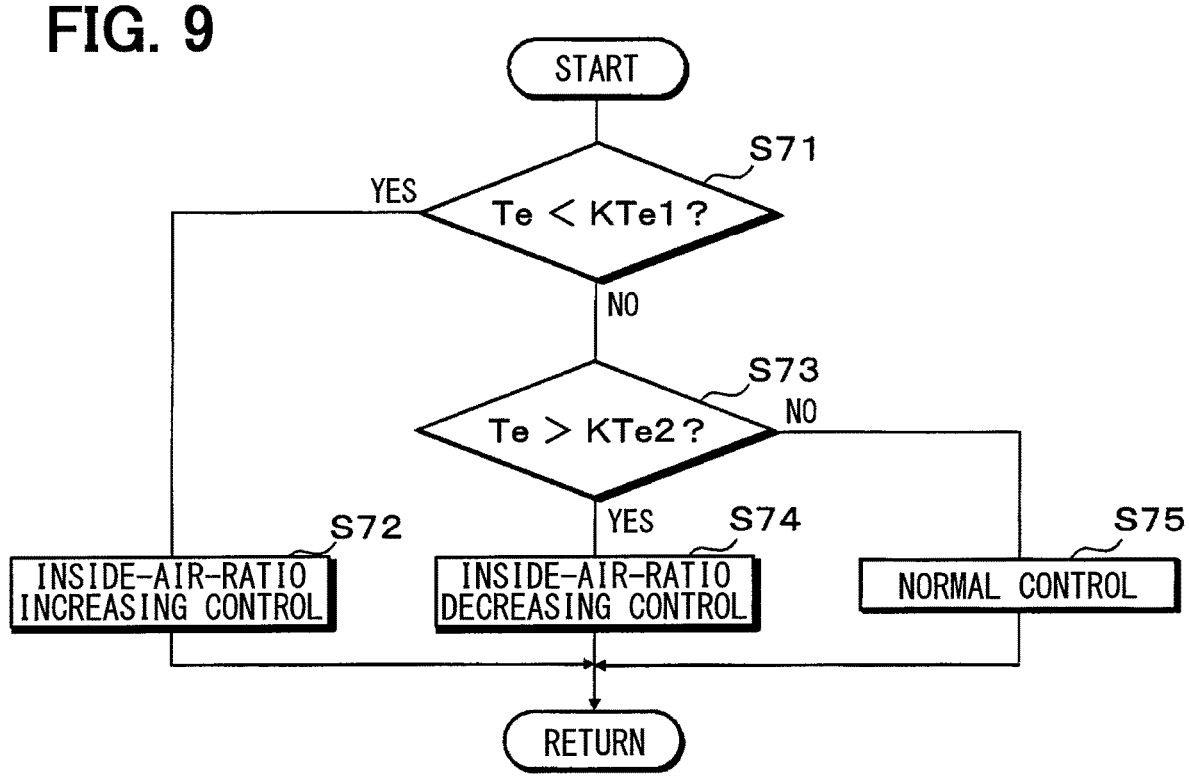
FIG. 9 is a flowchart depicting a subroutine during a dehumidifying and heating mode in control processing executed by an air conditioner for a vehicle according to a second embodiment.

In the dehumidifying and heating mode in the second embodiment, a control signal output to the electric actuator for the inside-outside air switching door is determined by executing a subroutine shown in FIG. 9. Specifically, the control signal is determined based on the evaporation temperature Te of the refrigerant in the interior evaporator 18 detected by the evaporator temperature sensor 56 and the target air temperature TAO.

First, the air-conditioning controller 40 determines whether the evaporation temperature Te of the refrigerant detected by the evaporator temperature sensor 56 is lower than the first reference evaporation temperature KTe1 at S71 as shown in FIG. 9. As an example, the first reference evaporation temperature KTe1 may be set to a temperature (e.g., 1° C.) at which the interior evaporator 18 does not get frosted.

When the evaporation temperature Te of the refrigerant is determined to be lower than the first reference evaporation temperature KTe1 at S71, the control flow advances to S72 and the air ratio increasing control is executed. When the evaporation temperature Te of the refrigerant is determined to be higher than or equal to the first reference evaporation temperature KTe1 at S71, the control flow advances to S73.

In the air ratio increasing control executed at S72, the same control flow as the air ratio increasing control in the first embodiment is performed. That is, in the air ratio increasing control executed at S72, the control signal output to the electric actuator for the inside-outside air switching door is set to increase the ratio of the inside air as the evaporation temperature Te of the refrigerant detected by the evaporator temperature sensor 56 falls.

In the second embodiment, the air conditioner 1 for a vehicle performs the air ratio increasing control so that the amount of heat absorbed by the refrigerant from the air in the interior evaporator 18 is increased to improve the heating performance in the dehumidifying and heating mode as in the first embodiment.

An appropriate flow rate of the refrigerant circulating in a refrigeration circuit in the cooling mode is different from an appropriate flow rate of the refrigerant circulating in the refrigeration circuit in the dehumidifying and heating mode. As such, abnormalities would be caused in the dehumidifying and heating mode due to the difference between the appropriate flow rate in the cooling mode and the appropriate flow rate in the dehumidifying and heating mode. For example, the interior evaporator 18 would be frosted, or oil would be stagnated. However, in the second embodiment, the air conditioner 1 for a vehicle executes the air ratio increasing control to suppress a cause of such abnormalities.

S73 includes determining whether or not the evaporation temperature Te of the refrigerant detected by the evaporator temperature sensor 56 is more than a second reference evaporation temperature KTe2. The second reference evaporation temperature KTe2 is more than the first reference evaporation temperature KTe1. The second reference evaporation temperature KTe2 is slightly less than the evaporation temperature Te of the refrigerant in a case where the interior evaporator 18 in the dehumidifying and heating mode exerts maximum dehumidifying capability.

In a case where the evaporation temperature Te of the refrigerant is more than the second reference evaporation temperature KTe2 at S73, the control flow proceeds to S74 for an air ratio decrease control in which a ratio of the inside air is decreased. In another case where the evaporation temperature Te of the refrigerant is determined as being equal to or less than the second reference evaporation temperature KTe2, the control flow proceeds to S75.

In the air ratio decreasing control executed at S74, the control signal output to the electric actuator for the inside-outside air switching door is set to decrease the ratio of the inside air as the evaporation temperature Te of the refrigerant detected by the evaporator temperature sensor 56 rises.

S75 includes executing ordinary control. The ordinary control is executed when the evaporation temperature Te of the refrigerant falls within the range from the first reference evaporation temperature KTe1 to the second reference evaporation temperature KTe2.

In the ordinary control performed at S75, the same control flow as the first embodiment is executed. That is, the control signal output to the electric actuator of the inside-outside air switching door is determined based on the target air temperature TAO with reference to the control map stored in the air-conditioning controller 40 in advance.

Figure 10:
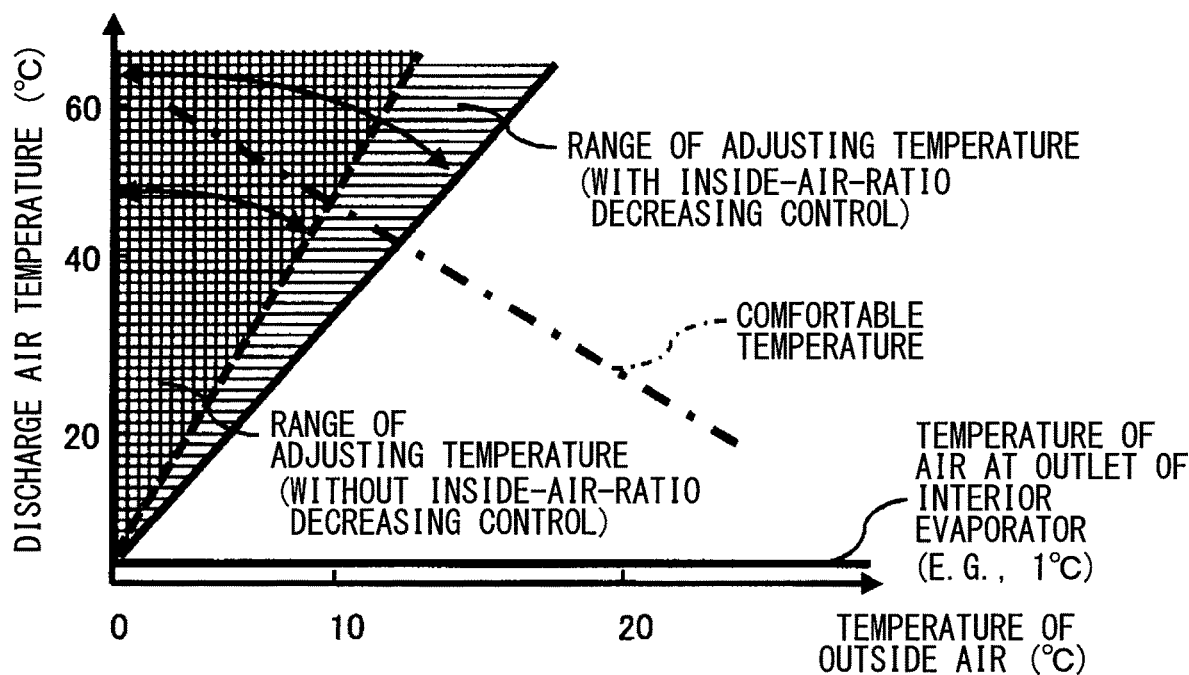
FIG. 10 is an explanatory graph of a temperature adjustable range of air sent to interior in the dehumidifying and heating mode according to the second embodiment.

The air ratio decrease control in the second embodiment will be described in terms of effect with reference to FIG. 10. As described above, the air conditioner 1 for a vehicle according to the second embodiment also includes a refrigerant flow path parallel connecting the exterior heat exchanger 16 and the interior evaporator 18 in the dehumidifying and heating mode.

As such, the pressure of the refrigerant in the exterior heat exchanger 16 and the pressure of the refrigerant in the interior evaporator 18 become equal to each other. As a result, the evaporation temperature of the refrigerant in the exterior heat exchanger 16 becomes equal to the evaporation temperature Te of the refrigerant in the interior evaporator 18.

However, the temperature of the air flowing into the cabin may be required to be adjusted by changing the amount of heat absorbed by the refrigerant from the outside air in the exterior heat exchanger 16 while maintaining the dehumidifying performance of the interior evaporator 18 in the dehumidifying and heating mode. In this situation, the amount of heat absorbed by the refrigerant from the outside air in the exterior heat exchanger 16 cannot be adjusted appropriately when the evaporation temperature of the refrigerant in the exterior heat exchanger 16 and the evaporation temperature Te of the refrigerant in the interior evaporator 18 are equal to each other. That is, a temperature adjustable range (i.e., a range of adjusting temperature) within which the temperature of the air flowing into the cabin is adjusted in the dehumidifying and heating mode is limited to a range shown by cross hatching in FIG. 10.

Especially, a temperature of the air flowing into the cabin may fall when the evaporation temperature of the refrigerant in the exterior heat exchanger 16 rises and the amount of heat absorbed by the refrigerant from the outside air in the exterior heat exchanger 16 is reduced.

However, since the exterior heat exchanger 16 and the interior evaporator 18 are connected to each other in parallel with each other with respect to the flow direction of refrigerant, the evaporation temperature Te of the refrigerant in the interior evaporator 18 rises as the evaporation temperature of the refrigerant in the exterior heat exchanger 16 rises. As such, it would be difficult to decrease the temperature of the air in the dehumidifying and heating mode below a temperature lower than the temperature adjustable range shown by cross hatching in FIG. 10.

Then, in the air ratio decreasing control executed in S74, the dehumidification load of the interior evaporator 18 is decreased by decreasing the ratio of the inside air taken in from the inside-outside air switching device 33. As such, the amount of heat absorbed by the refrigerant from the air in the interior evaporator 18 is reduced.

As described above, the heating performance in the dehumidifying and heating mode corresponds to an amount of heat radiated from the interior condenser 12. The heating performance in the dehumidifying and heating mode corresponds to a sum of an amount of heat corresponding to the compression workload of the compressor 11, an amount of heat absorbed by the refrigerant from the outside air in the exterior heat exchanger 16, and an amount of heat absorbed by the refrigerant from the air in the interior evaporator 18. The amount of heat absorbed by the refrigerant from the air in the interior evaporator 18 may be referred to as an air-side amount of heat.

In the second embodiment, the air conditioner 1 for a vehicle performs the air ratio decreasing control at S74 so that the amount of heat absorbed by the refrigerant from the air in the interior evaporator 18 is reduced to decrease the heating performance in the dehumidifying and heating mode. As such, the air conditioner 1 for a vehicle expands the temperature adjustable range, which is shown by cross hatching in FIG. 10 and within which the temperature of the air is adjusted in the dehumidifying and heating mode, to include a range shown by horizontal hatching. That is, the temperature adjustable range includes a lower range and a lowest temperature of the air is lowered. As a result, the temperature of the air can be set to a lower temperature.

By expands the temperature adjustable range to include the lower temperature range, a lower limit temperature of the temperature of the air flowing into the cabin decreased by the air conditioner 1 is lowered. As such, even when a comfortable temperature, which is a temperature applying a comfortable feeling to an occupant in the cabin, is relatively low, the air conditioner 1 may be able to decrease the temperature of the air to the comfortable temperature being relatively low.

As described above, the air conditioner 1 for a vehicle in the second embodiment executes the air ratio increasing control at S72 when determining the evaporation temperature Te of the refrigerant in the interior evaporator 18 to be lower than the first reference evaporation temperature KTe1. When the air ratio increasing control is executed at S72, the ratio of the inside air is increased as the evaporation temperature Te of the refrigerant falls. The increase in the ratio of the inside air results in an increase in the amount of heat absorbed by the refrigerant from the air in the interior evaporator 18. Thus, the air conditioner 1 improves the heating performance in the dehumidifying and heating mode by increasing the amount of heat absorbed by the refrigerant from the air in the interior evaporator 18.

That is, the air conditioner 1 for a vehicle improves the heating performance (i.e., an amount of heat radiated in the interior condenser 12) executed with the compression workload of the compressor 11 in the dehumidifying and heating mode. In addition, although the difference between the appropriate flow rate in the cooling mode and the appropriate flow rate in the dehumidifying and heating mode would cause an abnormality, the air conditioner 1 executes the air ratio increasing control to suppress the occurrence of the abnormality.

Furthermore, in the dehumidifying and heating mode, the air-conditioning controller 40 increases the ratio of the inside air as the evaporation temperature Te of the refrigerant in the interior evaporator 18 falls. It means that the air-conditioning controller 40 decreases the ratio of the inside air as the evaporation temperature Te of the refrigerant in the interior evaporator 18 rises in the dehumidifying and heating mode.

Therefore, the air conditioner 1 for a vehicle in the second embodiment executes the air ratio decreasing control at S74 when determining the evaporation temperature Te of the refrigerant in the interior evaporator 18 to be higher than the second reference evaporation temperature KTe2 in the dehumidifying and heating mode. When the air ratio decreasing control is executed at S74, the ratio of the inside air is decreased as the evaporation temperature Te of the refrigerant rises.

Thus, the refrigeration cycle device 10 decreases the dehumidification load of the interior evaporator 18 for dehumidifying the air by decreasing the ratio of the inside air as the evaporation temperature Te of the refrigerant in the interior evaporator 18 rises. The decrease in the dehumidification load of the interior evaporator 18 results in a decrease of the amount of heat absorbed by the refrigerant from the air in the interior evaporator 18. That is, when the compression workload of the compressor 1 and the amount of heat absorbed by the refrigerant from the outside air in the exterior heat exchanger 16 are fixed, the heating performance in the dehumidifying and heating mode is improved since the amount of heat absorbed by the refrigerant from the air in the interior evaporator 18 decreases.

The decrease in the ratio of the inside air results in a decrease in the amount of heat absorbed by the refrigerant from the air in the interior evaporator 18. The decrease in the amount of heat absorbed by the refrigerant from the air in the interior evaporator 18 results in a decrease of the heating performance in the dehumidifying and heating mode. Thus, the air conditioner 1 for a vehicle expands the temperature adjustable range within which the temperature of the air flowing into the cabin is adjusted to include the lower range in the dehumidifying and heating mode.

A temperature of the air flowing into the cabin is controlled to fall within the temperature adjustable range by the heating performance in the dehumidifying and heating mode. Thus, by reducing the amount of heat absorbed by the refrigerant from the air in the interior evaporator 18, the temperature adjustable range expands to include a lower temperature range. As such, the heating performance of the interior condenser 12 in the dehumidifying and heating mode in which the air after being cooled and dehumidified in the interior evaporator 18 is reheated in the interior condenser 12 becomes adjustable.

Third Embodiment

The third embodiment different from the above embodiments will be described next with reference to the drawings. The third embodiment provides the air conditioner 1 for a vehicle configured basically similarly to the air conditioner 1 in any one of the above embodiments. The third embodiment is different from the above embodiments in details of control through a subroutine executed in the dehumidifying and heating mode.

The following description accordingly includes the reference signs that are identical to those of the above embodiments and indicate the identical configurations described in the preceding description.

In the dehumidifying and heating mode in the third embodiment, a vapor compression refrigeration circuit is set so that the refrigerant circulates therein as being the same as that in the above-described embodiments. That is, the refrigerant passes through the compressor 11, the interior condenser 12, the first expansion valve 15a, the exterior heat exchanger 16, (the first switching valve 21,) and the accumulator 20 in this order and returns to the compressor 11 after flowing out of the accumulator 20. At the same time, the refrigerant passes through the compressor 11, the interior condenser 12, (the second switching valve 22,) the second expansion valve 15b, the interior evaporator 18, the evaporation-pressure control valve 19, and the accumulator 20 in this order and returns to the compressor 11 after flowing out of the accumulator 20.

Figure 11:
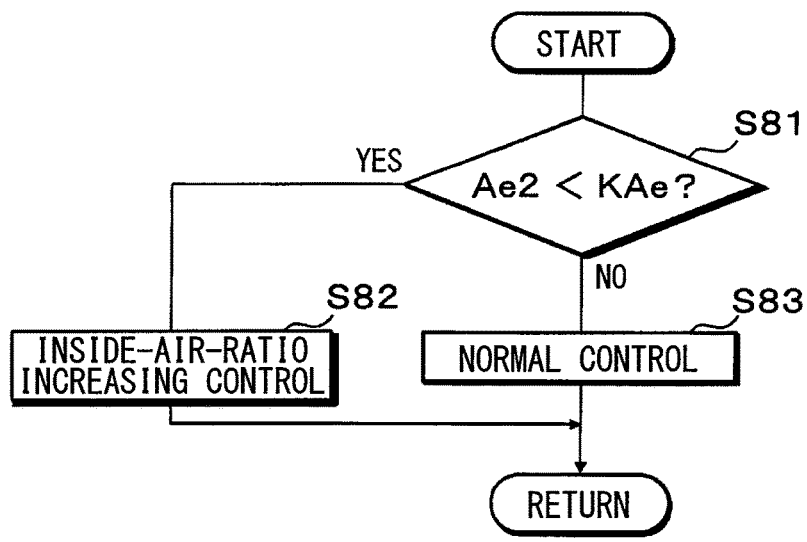
FIG. 11 is a flowchart depicting a subroutine during a dehumidifying and heating mode in control processing executed by an air conditioner for a vehicle according to a third embodiment.

In the dehumidifying and heating mode according to the third embodiment, a control signal output to the electric actuator for the inside-outside air switching door is determined through execution of a subroutine shown in FIG. 11. Unlike the above embodiments, the control signal according to the third embodiment is determined appropriately in accordance with an opening degree Ae2 of the second expansion valve 15b and the target air temperature TAO.

As described above, the second expansion valve 15b in the third embodiment includes of the valve body and the electric actuator. The valve body is configured to change the opening degree (i.e., a throttle degree) of the second expansion valve 15b. The electric actuator is formed of a stepping motor that moves the valve body to change the opening degree of the second expansion valve 15b. The air-conditioning controller 40 is configured to detects the opening degree Ae2 of the second expansion valve 15b based on a pulse number of the control signal input to the electric actuator for the second expansion valve 15b.

Figure 12:
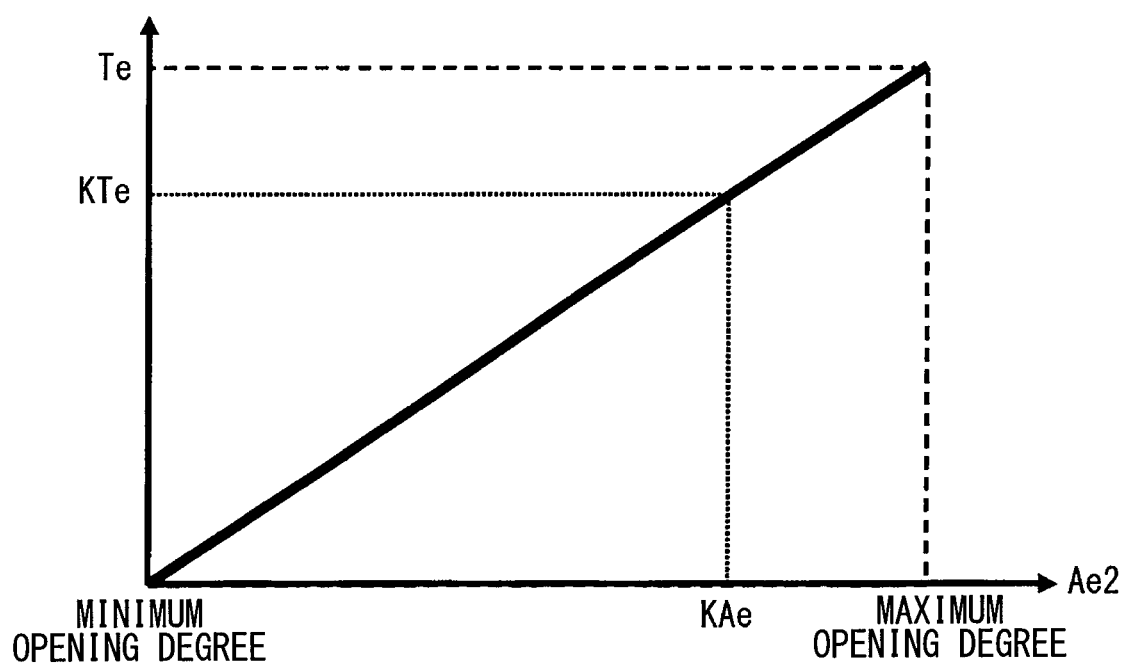
FIG. 12 is an explanatory graph depicting processing of determining an opening degree of a second expansion valve according to the third embodiment.

In the air conditioner 1 for a vehicle in the dehumidifying and heating mode according to the third embodiment, the second expansion valve 15b has an opening degree range from a predetermined minimum opening degree to a maximum opening degree, as indicated in FIG. 12.

In the dehumidifying and heating mode, the flow rate Ge of the refrigerant flowing through the second expansion valve 15b and the interior evaporator 18 is reduced as the opening degree Ae2 of the second expansion valve 15b reaches the minimum opening degree. That is, as shown in FIG. 12, the evaporation temperature Te of the refrigerant in the interior evaporator 18 falls as the opening degree Ae2 of the second expansion valve 15b is reduced. It means that the current dehumidification load of the interior evaporator 18 is small with respect to a dehumidification performance of the interior evaporator 18 at a maximum level and may be flexible to be improved. In other words, a level of the dehumidification load of the interior evaporator 18 can be increased to dehumidify the air more strongly.

On the other hand, the flow rate Ge of the refrigerant flowing through the second expansion valve 15b and the interior evaporator 18 increases as the opening degree Ae2 of the second expansion valve 15b reaches the maximum opening degree. That is, the evaporation temperature Te of the refrigerant in the interior evaporator 18 rises as the opening degree Ae2 of the second expansion valve 15b increases. It means that the current dehumidification load of the interior evaporator 18 corresponds to or is larger with respect to the dehumidification performance of the interior evaporator 18 at the maximum level and may not be improved any more.

The opening degree Ae2 of the second expansion valve 15b and the evaporation temperature Te of the refrigerant in the interior evaporator 18 have constant relation as indicated in FIG. 12. As such, is can be determined whether or not the air ratio increasing control can be executed based on the opening degree Ae2 of the second expansion valve 15b.

As an example, as shown in FIG. 11, it is determined at S81 whether the opening degree Ae2 is smaller than a reference opening degree KAe based on a control signal input to the electric actuator of the second expansion valve 15b. The reference opening degree KAe is set in advance, e.g., to an opening degree of the second expansion valve 15b at which the evaporation temperature Te of the refrigerant in the interior evaporator 18 becomes the reference evaporation temperature KTe.

When the opening degree Ae2 of the second expansion valve 15b is determined to be smaller than the reference opening degree KAe at S81, the control flow advances to S82 to start the air ratio increasing control. When the opening degree Ae2 of the second expansion valve 15b is determined to be greater than or equal to the reference opening degree KAe at S81, the control flow advances to S83.

In the air ratio increasing control executed at S82, the same control flow as the air ratio increasing control described above is performed. That is, in the air ratio increasing control executed at S82, the control signal output to the electric actuator for the inside-outside air switching door is set to increase the ratio of the inside air as the opening degree Ae2 of the second expansion valve 15b detected by a detector decreases.

As shown in FIG. 12, the evaporation temperature Te of the refrigerant in the interior evaporator 18 may be set based on the opening degree Ae2 of the second expansion valve 15b. As such, the same effects as the first embodiment can be obtained by setting the ratio of the inside air based on the opening degree Ae2 of the second expansion valve 15b.

In the third embodiment, the air conditioner 1 for a vehicle performs the air ratio increasing control so that the amount of heat absorbed by the refrigerant from the air in the interior evaporator 18 is increased to improve the heating performance in the dehumidifying and heating mode as in the above-described embodiments.

In the third embodiment, although abnormalities would be caused in the dehumidifying and heating mode due to the difference between the appropriate flow rate in the cooling mode and the appropriate flow rate in the dehumidifying and heating mode, the air conditioner 1 for a vehicle suppresses the occurrences of such abnormalities by executing the air ratio increasing control. As an example, the air conditioner 1 for a vehicle may suppress the occurrence of the frost formation in the interior evaporator or the stagnation of the refrigerant oil.

At S83, the ordinary control is executed as in the first embodiment. Specifically, the control signal output to the electric actuator of the inside-outside air switching door is determined based on the target air temperature TAO with reference to the control map stored in the air-conditioning controller 40 in advance.

As described above, in the third embodiment, the air conditioner 1 for a vehicle executes the air ratio increasing control at S82 when determining the opening degree Ae2 of the second expansion valve 15b is smaller than the reference opening degree KAe in the dehumidifying and heating mode. In the air ratio increasing control executed at S82, the ratio of the inside air rises as the opening degree Ae2 of the second expansion valve 15b decreases. The amount of heat absorbed by the refrigerant from the air in the interior evaporator 18 increases as the ratio of the inside air rises. As such, the heating performance in the dehumidifying and heating mode is improved. When the opening degree Ae2 of the second expansion valve 15b is decreased, it means that the evaporation temperature Te of the refrigerant in the interior evaporator 18 falls.

In the third embodiment, it is determined that whether execution of the air ratio increasing control is required without detecting the opening degree Ae2 of the second expansion valve 15b with a detector such as a sensor. As such, the heating performance in the dehumidifying and heating mode is improved with a simple structure.

In the dehumidifying and heating mode, the air conditioner 1 for a vehicle improves the heating performance obtained with a specified compression workload of the compressor 1, i.e., improves the amount of heat radiated in the interior condenser 12. In addition, although the difference between the appropriate flow rate of the refrigerant circulating in the cooling mode and the appropriate flow rate of the refrigerant circulating in the dehumidifying and heating mode would cause an abnormality, the air conditioner 1 executes the air ratio increasing control to suppress the occurrence of the abnormality.

Other Embodiments

The embodiments of the present disclosure have been described above, although the present disclosure should not be limited to any one of the embodiments. The present disclosure can be modified variously within a range not departing from the gist of the present disclosure. For example, any of the above embodiments may be combined where appropriate.

The above embodiments can alternatively be modified variously as follows, for example.

(1) The above embodiments each describe the exemplary case where the refrigeration cycle device 10 according to the present disclosure is included in the air conditioner 1 for a vehicle mounted on an electric vehicle. The present disclosure is also applicable to a different case. For example, the refrigeration cycle device 10 may be included in an air conditioner mounted to a vehicle that generates power for moving the vehicle from an internal combustion engine (i.e., engine). Alternatively, the refrigeration cycle device 10 may be included in an air conditioner mounted to a hybrid vehicle that generates power for moving the hybrid vehicle from both an electric motor and an internal combustion engine.

The air conditioner 1 for a vehicle to be included in a vehicle having an internal combustion engine is optionally provided with, as an auxiliary air heater, a heater core configured to heat air by means of cooling water of the internal combustion engine as a heat source. The refrigeration cycle device 10 according to the present disclosure is not limitedly applicable a vehicle, but may also be included in a stationary air conditioner or the like.

The above embodiments each exemplify the case where the interior condenser 12 functioning as a heating heat exchanger exchanges heat between the refrigerant discharged from the compressor 11 and air to directly heat the air by means of the discharged refrigerant as a heat source. The present disclosure is not limitedly applicable to heating air in such a heating heat exchanger.

As an example, the refrigeration cycle device 10 may include a heat medium circuit through which a heat medium circulates. The heat medium circuit may mount a water-refrigerant heat exchanger and a heating heat exchanger. The water-refrigerant heat exchanger performs a heat exchange between the refrigerant flowing out of the compressor 11 and the heat medium. The heating heat exchanger heats the air by performing a heat exchange between the heat medium after heated in the water-refrigerant heat exchanger and the air. The heating heat exchanger uses the refrigerant flowing out of the compressor 11 as a heat source and heats the air indirectly via the heat medium.

(2) The above embodiments each exemplify the refrigeration cycle device 10 configured to switch among the refrigeration circuits for the heating mode, the dehumidifying and heating mode, and the cooling mode. The effect of each of the embodiments can be achieved by a refrigeration cycle device configured to be switchable at least between the dehumidifying and heating mode and the cooling mode according to corresponding one of the embodiments.

In the above-described embodiments, the refrigeration cycle device 10 may be operated in an auxiliary dehumidifying and heating mode, e.g., an in-series dehumidifying and heating mode, in which the air flowing into the cabin is dehumidified and heated. Specifically, the refrigeration cycle device 10 is operated in the auxiliary dehumidifying and heating mode by setting a specified refrigeration circuit and controlling the opening degrees of the first expansion valve 15a and the second expansion valve 15b. More specifically, the refrigeration cycle device 10 closes the first switching valve 21 and the second switching valve 22 to connect the exterior heat exchanger 16 and the interior evaporator 18 to each other directly as in the cooling mode. At the same time, the refrigeration cycle device 10 adjusts the opening degrees of the first expansion valve 15a and the second expansion valve 15b are changed based on the target air temperature TAO.

Specifically, in the auxiliary dehumidifying and heating mode, the opening degree of the first expansion valve 15a is reduced and the opening degree of the second expansion valve 15b is increased as the target air temperature TAO rises. In this example, the heating performance of the interior condenser 12 heating the air is changed by switching a state of the exterior heat exchanger 16 serving as a radiator to a state of the exterior heat exchanger 16 serving as an evaporator.

(3) In the above-described embodiments, the air ratio increasing control in the dehumidifying and heating mode is executed focusing on the evaporation temperature Te of the refrigerant in the interior evaporator 18. However, the air ratio increasing control in the dehumidifying and heating mode may be executed based on another factor. As an example, the air ratio increasing control in the dehumidifying and heating mode may be executed using the evaporation pressure of the refrigerant in the interior evaporator 18. Since the evaporation pressure of the refrigerant in the interior evaporator 18 corresponds to the evaporation temperature Te of the refrigerant in the interior evaporator 18, a control flow using the evaporation pressure may be the same as the control flow using the evaporation temperature Te.

(4) In the air ratio increasing control, the ratio of the inside air may be increased continuously as the evaporation temperature Te of the refrigerant falls as long as the ratio of the inside air increases as the evaporation temperature Te of the refrigerant falls. Alternatively, the ratio of the inside air may be increases in stages. As an example, a plurality of temperature ranges are defined for the evaporation temperature Te of the refrigerant, and a plurality of ratios of the inside air are set in the temperature ranges respectively. The relationship between the temperature ranges of the evaporation temperature Te of the refrigerant and the ratios of the inside air is stored in a control map. The air ratio increasing control may be executed using the control map. In this case, the ratio of the inside air is set based on the corresponding temperature range of the evaporation temperature Te of the refrigerant in the interior evaporator 18. The air ratio decreasing control may be executed in the similar manner as the air ratio increasing control.

(5) In the first embodiment, the ratio of the inside air is increased as the evaporation temperature Te of the refrigerant falls when the evaporation temperature Te of the refrigerant in the interior evaporator 18 is lower than the reference evaporation temperature KTe. However, this is an example.

When the evaporation temperature Te of the refrigerant in the interior evaporator 18 is higher than a specified temperature, the air ratio decreasing control may be executed so that the ratio of the inside air falls as the evaporation temperature Te of the refrigerant rises. When the evaporation temperature Te of the refrigerant in the interior evaporator 18 is the specified temperature or lower, an ordinary control may be executed. As an example, the specified temperature may be the second reference evaporation temperature KTe2 described in the second embodiment.

With this structure, the air conditioner 1 for a vehicle expands the temperature adjustable range within which the temperature of the air flowing into the cabin in the dehumidifying and heating mode to include the lower range.

(6) The above embodiments each exemplify switching among the operation modes through execution of the air conditioning control program. The present disclosure is not limited to such switching among the operation modes. For example, the operation panel may be provided with an operation mode setting switch configured to set each operation mode, to achieve switching among the heating mode, the cooling mode, and the dehumidifying and heating mode in accordance with an operation signal from the operation mode setting switch.

What is claimed is:

1. A refrigeration cycle device for an air conditioner, comprising:
    a compressor compressing a refrigerant and discharging the refrigerant;
    a heating heat exchanger heating an air flowing toward an air conditioning target space, the heating heat exchanger using, as a heat source, the refrigerant discharged from the compressor;
    a first decompressor decompressing the refrigerant;
    an exterior heat exchanger performing a heat exchange between the refrigerant decompressed in the first decompressor and an outside air, the outside air being an air outside the air conditioning target space;
    a second decompressor decompressing the refrigerant;
    a cooling heat exchanger performing a heat exchange between the refrigerant decompressed in the second decompressor and the air before passing through the heating heat exchanger;
    an evaporation-pressure control valve adjusting an evaporation pressure of the refrigerant in the cooling heat exchanger;
    an inside-air ratio adjuster changing a ratio of a volume of an inside air to an entire volume of the air exchanging heat with the refrigerant in the cooling heat exchanger, the inside air being an air inside the air conditioning target space; and
    a controller controlling the inside-air ratio adjuster, wherein
    the evaporation-pressure control valve increases the evaporation pressure of the refrigerant as a flow rate of the refrigerant flowing through the evaporation-pressure control valve increases,
    the refrigeration cycle device is configured to set a first mode in which the air being cooled and dehumidified is reheated and the reheated air flows into the air conditioning target space,
    the refrigeration cycle device is configured to set a refrigeration circuit in the first mode that allows a flow of the refrigerant flowing out of the heating heat exchanger to be divided into a first flow of the refrigerant and a second flow of the refrigerant,
    the refrigeration circuit in the first mode
        allows the refrigerant in the first flow to circulate therethrough while passing through the first decompressor, the exterior heat exchanger, and the compressor in this order and
        allows the refrigerant in the second flow to circulate therethrough while passing through the second decompressor, the cooling heat exchanger, the evaporation-pressure control valve, and the compressor in this order, and
    the controller, in the first mode, increases the ratio of the inside air as an evaporation temperature of the refrigerant in the cooling heat exchanger falls.

2. The refrigeration cycle device of claim 1, wherein the controller, in the first mode, increases the ratio of the inside air as the evaporation temperature of the refrigerant in the cooling heat exchanger falls when the evaporation temperature of the refrigerant in the cooling heat exchanger is lower than a reference evaporation temperature.

3. The refrigeration cycle device of claim 1, wherein the controller, in the first mode,
    increases the ratio of the inside air as the evaporation temperature of the refrigerant in the cooling heat exchanger falls when the evaporation temperature of the refrigerant in the cooling heat exchanger is lower than a first reference evaporation temperature and
    decreases the ratio of the inside air as the evaporation temperature of the refrigerant in the cooling heat exchanger rises when the evaporation temperature of the refrigerant in the cooling heat exchanger is higher than a second reference evaporation temperature, and
    the second reference evaporation temperature is higher than the first reference evaporation temperature.

4. The refrigeration cycle device of claim 1, wherein the refrigeration cycle device is configured to set a second mode different from the first mode, the second mode in which the air being cooled flows into the air conditioning target space, and
    the refrigeration cycle device is configured to set a refrigeration circuit in the second mode that allows the refrigerant to flow therethrough while passing through the heating heat exchanger, the first decompressor, the exterior heat exchanger, the second decompressor, the cooling heat exchanger, the evaporation-pressure control valve, and the compressor in this order.

5. The refrigeration cycle device of claim 1, wherein at least one of the first decompressor or the second decompressor is formed of a valve operated by an electric actuator, and
    the controller controls the inside-air ratio adjuster based on an opening degree of the valve operated by the electric actuator when increasing the ratio of the inside air as the evaporation temperature of the refrigerant falls.

6. An air conditioner for a vehicle comprising:
    an air conditioning unit including a casing that defines an air passage therein through which air flows and that takes in the air from an air inlet formed in the casing, the air being at least one of an inside air from an inside of a cabin of the vehicle or an outside air from an outside of the cabin taken into the casing;

an inside-outside air switching door disposed in the air inlet of the casing and configured to adjust a ratio of a volume of the inside air to a total volume of the air taken into the casing;

a refrigeration cycle device through which a refrigerant circulates, the refrigeration cycle device including
- a compressor drawing the refrigerant, compresses the refrigerant to be the refrigerant at a high temperature and a high pressure, and discharges the refrigerant at the high temperature and the high pressure,
- a heating heat exchanger disposed in the air passage of the casing to allow the air to pass therethrough, the heating heat exchanger configured to heat the air by performing a heat exchange between the air and the refrigerant at the high temperature and the high pressure,
- a decompressor decompresses the refrigerant flowing from the heating heat exchanger to be the refrigerant at a low temperature,
- a cooling heat exchanger located upstream of the heating heat exchanger in the air passage along a flow direction of air along which the air flows through the air passage, the cooling heat exchanger configured to cool the air before flowing into the heating heat exchanger by performing a heat exchange between the refrigerant at the low pressure and the air, and
- an evaporation-pressure control valve through which the refrigerant flowing out of the cooling heat exchanger flows, the evaporation-pressure control valve configured to adjust an evaporation pressure of the refrigerant evaporated in the cooling heat exchanger during the heat exchange;

a sensor configured to detect an evaporation temperature of the refrigerant evaporated in the cooling heat exchanger during the heat exchange; and a controller, wherein the evaporation-pressure control valve defines a refrigerant passage therein and includes a mechanical mechanism that is configured to change a sectional area of the refrigerant passage, the evaporation-pressure control valve decreases the sectional area of the refrigerant passage to increase the evaporation pressure of the refrigerant in the cooling heat exchanger as a flow rate of the refrigerant flowing through the refrigerant passage increases, the controller operates an air mix door disposed in the air passage of the casing between the cooling heat exchanger and the heating heat exchanger along the flow direction of air to set a first mode in which the air cooled in the cooling heat exchanger is heated in the heating heat exchanger and the heated air flows into the cabin, and in the first mode, the controller operates the inside-outside air switching door to increase the ratio of the volume of the inside air as the evaporation temperature of the refrigerant being evaporated in the cooling heat exchanger falls.

* * * * *